(12) United States Patent
Yoshida et al.

(10) Patent No.: US 10,401,554 B2
(45) Date of Patent: Sep. 3, 2019

(54) LIGHT-GUIDING DEVICE AND DISPLAY DEVICE

(71) Applicant: SEIKO EPSON CORPORATION, Tokyo (JP)

(72) Inventors: Shohei Yoshida, Suwa-gun (JP); Atsushi Saito, Chino (JP); Hiroyuki Tatsugi, Chino (JP); Masatoshi Yonekubo, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/143,985

(22) Filed: Sep. 27, 2018

(65) Prior Publication Data

US 2019/0094451 A1 Mar. 28, 2019

(30) Foreign Application Priority Data

Sep. 28, 2017 (JP) .................. 2017-187590
Dec. 27, 2017 (JP) .................. 2017-250704

(51) Int. Cl.
*F21V 8/00* (2006.01)
*G02B 27/09* (2006.01)
*H04N 13/344* (2018.01)
*G02B 27/01* (2006.01)

(52) U.S. Cl.
CPC ........... *G02B 6/0055* (2013.01); *G02B 27/01* (2013.01); *G02B 27/095* (2013.01); *G02B 27/0977* (2013.01); *H04N 13/344* (2018.05)

(58) Field of Classification Search
CPC .... G02B 6/0055; G02B 27/01; G02B 27/095; G02B 27/0977
See application file for complete search history.

(56) References Cited

U.S. PATENT DOCUMENTS

2015/0338657 A1   11/2015   Hotta et al.
2017/0322417 A1   11/2017   Sekiguchi et al.

FOREIGN PATENT DOCUMENTS

| JP | 2006-284860 A | 10/2006 |
|---|---|---|
| JP | 2008-64911 A | 3/2008 |
| JP | 2015-219511 A | 12/2015 |
| JP | 2016-110108 A | 6/2016 |
| JP | 2016-110782 A | 6/2016 |
| JP | 2016-142838 A | 8/2016 |
| JP | 2017-32924 A | 2/2017 |

*Primary Examiner* — Thomas M Sember
(74) *Attorney, Agent, or Firm* — Oliff PLC

(57) ABSTRACT

A light-guiding device used in a display device includes a plurality of first half mirrors between a first light-guiding body and a second light-guiding body. Each of the first half mirrors is formed on a first surface extending along a first direction of the first surface and a second surface extending along a second direction in the first light-guiding body. The first light-guiding body includes a third surface overlapping the second surface in a direction along a third direction in which two first surfaces located on both sides of the second surface do not overlap each other between the first surface and the second surface. The third surface extends in a direction different from the first direction.

20 Claims, 15 Drawing Sheets

LIGHT-GUIDING DEVICE AND DISPLAY DEVICE

The present application is based on and claims priority from JP Application Serial Number 2017-187590, filed Sep. 28, 2017 and 2017-250704, filed Dec. 27, 2017, the disclosure of which is hereby incorporated by reference herein in its entirety.

BACKGROUND

1. Technical Field

The disclosure relates to a light-guiding device that reflects incident light in a predetermined direction and emits the light and a display device.

2. Related Art

It is conceivable that a display device causes image light emitted from an image light emitting device to be incident on an eye of an observer via a light-guiding device (see JP-A-2017-32924 and JP-A-2016-110108). As illustrated in FIG. 20, the light-guiding device theoretically has a configuration including a reflection layer 80 between a first light-guiding body 60 and a second light-guiding body 70. More specifically, the first light-guiding body 60 includes a plurality of first surfaces 61 each extending along a first direction A and a plurality of second surfaces 62 each extending along a second direction B intersecting the first direction A between adjacent first surfaces 61. The reflection layer 80 is formed on the first surface 61. Therefore, as indicated by an arrow L1 in FIG. 20, image light L0 traveling toward the reflection layer 80 in the first light-guiding body 60 can be reflected by the reflection layer 80 toward an eye of an observer.

In JP-A-2017-32924 and JP-A-2016-110108, it is conceivable that a half mirror is adopted as the reflection layer 80. In this case, external light can reach an eye of an observer via the reflection layer 80 (half mirror). Note that, in JP-A-2017-32924 and JP-A-2016-110108, an aspect in which the reflection layer 80 (half mirror) is formed on a part of the first surface 61 is conceivable. According to the aspect, external light can reach the eye of the observer via a region of the first surface 61 in which the reflection layer 80 is not formed.

However, when the half mirror is used as the reflection layer 80, a part of the image light L0 as indicated by an arrow L2 in FIG. 20 passes through the reflection layer 80, then passes through the second surface 62, and is subsequently reflected by the adjacent reflection layer 80 toward the eye of the observer. At this time, when the first light-guiding body 60 has a refractive index different from a refractive index of the second light-guiding body 70, the beam of light indicated by the arrow L2 is affected by the refraction by the first surface 61, the second surface 62, and the end face 65 of the first light-guiding body 60, and is then emitted from a direction different from the beam of light indicated by the arrow L1 toward the eye of the observer. As a result, the observer may recognize a ghost due to the beam of light indicated by the arrow L2.

This can be eliminated by setting a refractive index n1 of the first light-guiding body 60 identical to a refractive index n2 of the second light-guiding body 70. However, for example, when an inclination angle α of the reflection layer 80 is 15°, a light beam angle θ is 30°, and 1920 pixels are displayed at a horizontal angle of view of ±20°, a difference between the refractive index n1 of the first light-guiding body 60 and the refractive index n2 of the second light-guiding body 70 is set equal to or less than 0.012% in order to reduce a pixel of a ghost to equal to or less than one. It may be difficult to select a material to be used for the first light-guiding body 60 and the second light-guiding body 70 to satisfy the condition.

Note that FIG. 4A in JP-A-2017-32924 illustrates an aspect in which a third surface extends in a direction different from a first direction A between a first surface 61 and a second surface 62. However, JP-A-2017-32924 does not describe a relationship between the third surface and the above-described ghost at all. Furthermore, in order to emit the image light L0 from the reflection layer 80 toward the eye of the observer as illustrated in FIG. 2 in JP-A-2017-32924, an incident angle with the reflection layer 80 is increased further than the aspect described in FIG. 2 in JP-A-2017-32924. In this case, when the light that has passed through the reflection layer 80 is reflected by the adjacent reflection layer 80 toward the eye of the observer, the light may be affected by the refraction by the first surface 61, the second surface 62, and the end face 65 of the first light-guiding body 60, and thus a ghost may conceivably occur.

Also in JP-A-2016-110108, it is conceivable that a light-absorbing layer is applied to the second surface 62. However, it may not be easy to apply the light-absorbing layer to a deep gap between the first surface 61 and the second surface 62 of a vertical wall surface like the second surface 62.

SUMMARY

The disclosure provides a light-guiding device capable of preventing an occurrence of a ghost and the like due to refraction between a first light-guiding body and a second light-guiding body when image light is reflected by a half mirror provided between the first light-guiding body and the second light-guiding body, and a display device.

One aspect of a light-guiding device according to the disclosure includes a first light-guiding body that includes, on a first side in a thickness direction, a plurality of first surfaces each extending along a first direction and a plurality of second surfaces each extending along a second direction intersecting the first direction between adjacent first surfaces among the plurality of first surfaces, and includes an end face on a second side in the thickness direction, a plurality of first half mirrors each contacting the plurality of first surfaces, and a second light-guiding body contacting the plurality of first half mirrors and the plurality of second surfaces. The first light-guiding body includes a plurality of third surfaces, between adjacent first surface and second surface among the plurality of first surfaces and the plurality of second surfaces, each of the plurality of third surfaces overlapping the second surface in a direction along a third direction in which two first surfaces located on both sides of the second surface do not overlap each other. Each of the plurality of third surfaces extends in a direction different from the first direction. In the disclosure, a "half mirror" represents a layer having reflectivity and transparency, and is not limited to a case where a reflectance is 50%.

According to an aspect of the disclosure, light that travels toward the first surface in the first light-guiding body travels toward the first surface in the first light-guiding body, and a part of the light is reflected by the first half mirror in a direction opposite from the second light-guiding body and then emitted from the end face. At this time, other part of the light passes through the first half mirror. Further, a part of external light incident on the first half mirror from the first side in the thickness direction passes through the first half mirror and is then emitted from the end face. Herein, the first light-guiding body includes a third surface extending in a direction different from the first direction between the first surface and the second surface, and adjacent first surfaces do not overlap each other in the third direction. Therefore, the light that has passed through the first half mirror passes through the second surface and is then incident on the third surface without being incident on the adjacent first surface (first half mirror). Thus, the light that has passed through the first half mirror is emitted to a direction different from the light reflected by the first half mirror. Accordingly, in the display device including the light-guiding device, even when the image light that has passed through the first half mirror is refracted by the first surface, the second surface, and the end face in a case where the first light-guiding body has a refractive index different from a refractive index of the second light-guiding body, a ghost due to such refraction is less likely to be recognized by the observer.

According to an aspect of the disclosure, the first light-guiding body may have a refractive index different from a refractive index of the second light-guiding body.

According to an aspect of the disclosure, the light-guiding device may further include a plurality of second half mirrors each contacting the plurality of third surfaces between the first light-guiding body and the second light-guiding body. Therefore, a part of the external light incident on the third surface from the first side in the thickness direction passes through the second half mirror and is then emitted from the end face. Even when the image light that has passed through the first half mirror and the second surface reaches the third surface, the light can be prevented from being emitted from the light-guiding device to the first side in the thickness direction.

According to an aspect of the disclosure, the first half mirror may have a reflectance identical to a reflectance of the second half mirror. Therefore, the external light passing through the light-guiding device can be uniform. When the external light is uniform, diffraction is less likely to occur, and thus the observer can observe clear external light.

According to an aspect of the disclosure, the first half mirror may have a reflectance different from a reflectance of the second half mirror. For example, when the second half mirror has a reflectance lower than a reflectance of the first half mirror, the amount of light of a ghost can be reduced.

According to an aspect of the disclosure, each of the plurality of third surfaces may be provided, between adjacent first surface and second surface among the plurality of first surfaces and the plurality of second surfaces, between an end portion of the first surface on the first side in the thickness direction and an end portion of the second surface on the first side in the thickness direction. Therefore, an extending length of the first surface on the second side in the thickness direction can be extended further than the case where the third surface is provided between an end portion of the first surface on the second side in the thickness direction and an end portion of the second surface on the second side in the thickness direction. Thus, the amount of light reflected by the first half mirror and emitted from the end face can be increased.

According to an aspect of the disclosure, the first light-guiding body may include a fourth surface extending along the third direction, between adjacent first surface and second surface among the plurality of first surfaces and the plurality of second surfaces, between an end portion of the first surface on the second side in the thickness direction and an end portion of the second surface on the second side in the thickness direction. Therefore, an extending distance of the third surface can be shortened, and thus an extending length of the first surface on the first side in the thickness direction can be extended. Therefore, the amount of light reflected by the first half mirror and emitted from the end face can be increased.

According to an aspect of the disclosure, the light-guiding device may further include a plurality of third half mirrors each contacting the plurality of fourth surfaces between the first light-guiding body and the second light-guiding body.

According to an aspect of the disclosure, each of the plurality of third surfaces may be parallel to a direction in which the plurality of first surfaces and the plurality of second surfaces are arranged.

According to an aspect of the disclosure, each of the plurality of third surfaces may be an oblique surface inclined obliquely to a direction in which the plurality of first surfaces and the plurality of second surfaces are arranged.

According to an aspect of the disclosure, each of the plurality of third surfaces may be at least one of a protruding curved surface in which a central portion between a first boundary between the first surface and the third surface and a second boundary between the second surface and the third surface protrudes farther than the first boundary and the second boundary, and a recessed curved surface in which the central portion is recessed farther than the first boundary and the second boundary.

According to an aspect of the disclosure, the third direction may be a direction in which a beam of light incident on the first half mirror passes through the first half mirror and the second surface and travels. Therefore, the light that has passed through the first half mirror can be reliably reflected by the third surface in a direction different from the light reflected by the first half mirror.

According to an aspect of the disclosure, positions of the plurality of first surfaces in the thickness direction may vary along a direction in which the plurality of first surfaces are arranged with reference to the end face.

According to an aspect of the disclosure, the light-guiding device may further include a plurality of fourth half mirrors each contacting the plurality of second surfaces between the first light-guiding body and the second light-guiding body.

According to an aspect of the disclosure, each of the plurality of first surfaces may be a recessed curved surface being recessed toward the second light-guiding body. Therefore, condensing light incident on the first surface can be achieved.

According to an aspect of the disclosure, each of the plurality of first surfaces may extend while being curved in a direction orthogonal to a direction in which the plurality of first surfaces and the plurality of second surfaces are arranged in such a way as to be a recessed curved surface being recessed in the direction in which the plurality of first surfaces and the plurality of second surfaces are arranged. Therefore, condensing light incident on the first surface in a direction orthogonal to the direction in which the plurality of first surfaces and the plurality of second surfaces are arranged can be achieved.

In this case, the second surface may be curved along the first surface. In such a case, the entire light-guiding device is curved, and even when the first surface is curved, the light-guiding device can be prevented from having a great thickness in a direction in which the first light-guiding body overlaps the second light-guiding body.

According to an aspect of the disclosure, a curvature of each of the plurality of first surfaces may vary along a direction in which the plurality of first surfaces and the plurality of second surfaces are arranged. Therefore, each of the plurality of first surfaces can achieve condensing light properly in each of their positions in the direction in which the plurality of first surfaces and the plurality of second surfaces are arranged.

One aspect of a display device including a light-guiding device according to the disclosure includes the light-guiding device, and an image light emitting device configured to emit image light. The image light, in the first light-guiding body, is incident on each of the plurality of first surfaces from the third direction.

According to an aspect of the disclosure, the image light may be incident on the first light-guiding body from the end face of the first light-guiding body.

According to an aspect of the disclosure, the display device may further include a light-guiding optical system configured to direct the image light emitted from the image light emitting device to the first light-guiding body in an optical path from the image light emitting device to the first light-guiding body.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

Exemplary embodiments of the disclosure will be described below with reference to the accompanying drawings. Note that, in each of the drawings below, to make each of layers and each of members a recognizable size, each of the layers and each of the members are illustrated to be different from an actual scale.

Exemplary Embodiment 1

Overall Configuration

Figure 1:
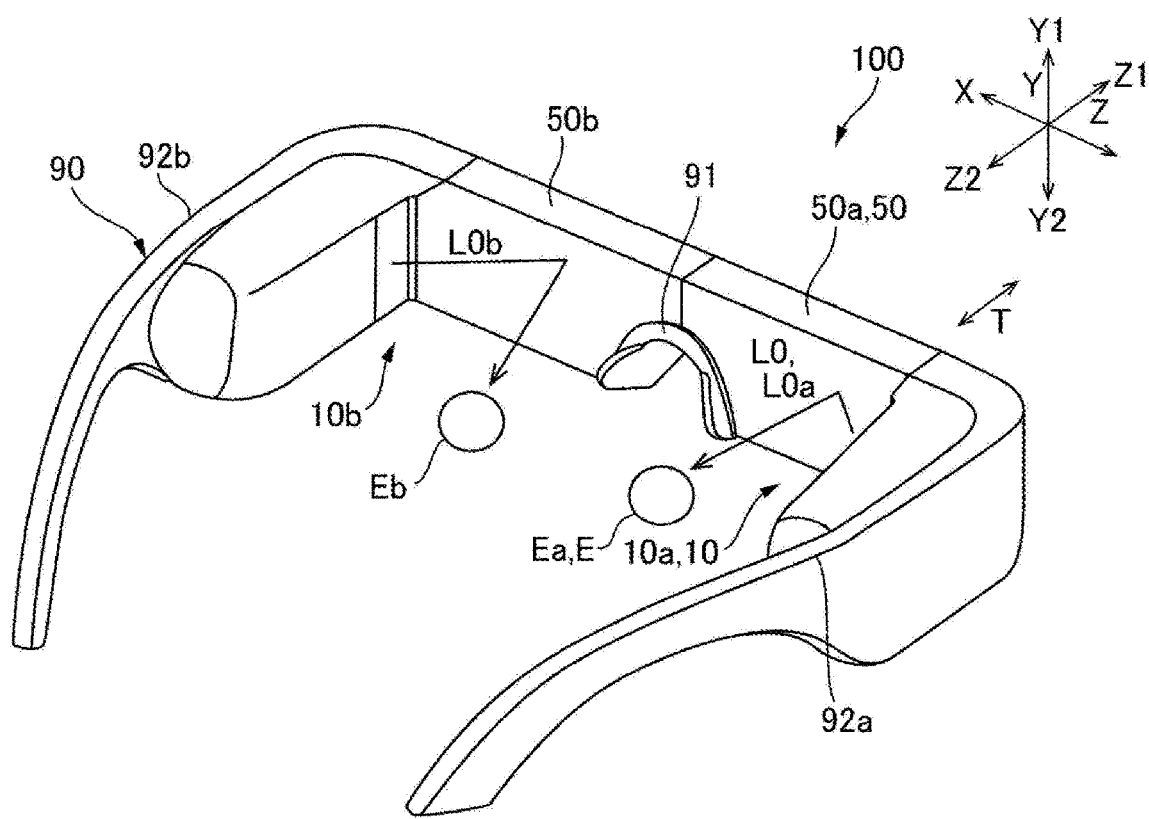
FIG. 1 is an external view illustrating one aspect of an external appearance of a display device according to Exemplary Embodiment 1 of the disclosure.
Figure 2:
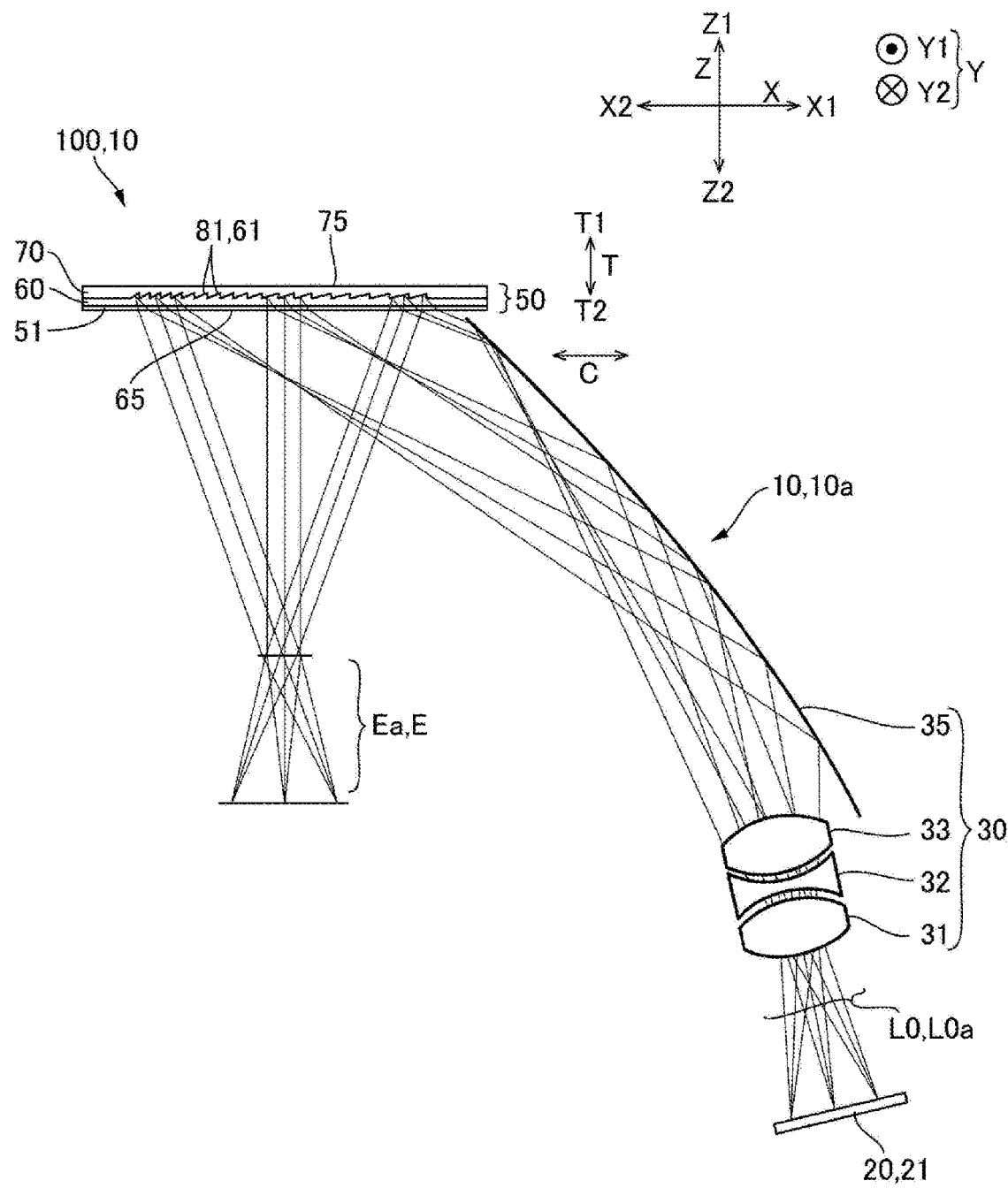
FIG. 2 is a plan view of an optical system of a display section illustrated in FIG. 1.

FIG. 1 is an external view illustrating one exemplary embodiment of an external appearance of a display device 100 according to Exemplary Embodiment 1 of the disclosure. FIG. 2 is a plan view of an optical system of a display section 10 illustrated in FIG. 1. Note that, in FIGS. 1 and 2, an anteroposterior direction, a horizontal direction, and a vertical direction are respectively indicated by Z, X, and Y. A front side, a rear side, an upper side, and a lower side are respectively indicated by Z1, Z2, Y1, and Y2. In FIG. 2 illustrating a right-eye display section 10a, a right side (ear side) and a left side (nose side) are respectively provided with X1 and X2. FIG. 2 illustrates beams of light at the center of an angle of view and beams of light at both ends of the angle of view as image light L0 emitted from an image light emitting device 20.

The display device 100 illustrated in FIG. 1 is a head-mounted display device such as a see-through eyeglass display. The display device 100 includes the right-eye display section 10a that causes image light 10a to be incident on a right eye Ea and a left-eye display section 10b that causes image light L0b to be incident on a left eye Eb. The display device 100 includes a frame 90 that holds the display sections 10a and 10b. The frame 90 is mounted on a head of an observer. The frame 90 includes a front portion 91 that holds a right-eye light-guiding device 50a and a left-eye light-guiding device 50b described later. The image light emitting device 20 and the like described later with reference to FIG. 2 are held by a right temple 92a and a left temple 92b of the frame 90.

The right-eye display section 10a and the left-eye display section 10b are disposed symmetrically with the identical configuration. Therefore, the right-eye display section 10a will be mainly described in description below, and description of the left-eye display section 10b will be omitted. In addition, the right-eye display section 10a and the left-eye display section 10b will be described as the display section 10 without distinction in the description below.

As illustrated in FIG. 2, the display section 10 (display section 10a) includes the image light emitting device 20 that emits the image light L0 and a light-guiding device 50 that emits the image light L0 emitted from the image light emitting device 20 toward an eye E of the observer. The display section 10 further includes, in an optical path from the image light emitting device 20 to the light-guiding device 50, a light-guiding optical system 30 that directs the image light L0 emitted from the image light emitting device 20 to the light-guiding device 50. The light-guiding device 50 is disposed on the front side Z1 of the eye E. The image light emitting device 20 is disposed in a temporal region. The light-guiding optical system 30 is disposed on the front side of the image light emitting device 20.

In one exemplary embodiment, the image light emitting device 20 includes a display panel 21 such as an organic electroluminescent display element. According to Exemplary Embodiment 1, a small-sized display section 10 capable of displaying a high-quality image can be provided. Also in one exemplary embodiment, the image light emitting device 20 may include an illumination light source (not illustrated) and a display panel 21 such as a liquid crystal display element that modulates illumination light emitted from the illumination light source. According to Exemplary Embodiment 1, the illumination light source can be selected, and thus there is an advantage of increasing flexibility in a wavelength characteristic of the image light L0. Herein, in one exemplary embodiment, the image light emitting device 20 includes one display panel 21 that enables color display. Also in one exemplary embodiment, the image light emitting device 20 may include a plurality of display panels 21 corresponding to respective colors and a synthesis optical system that synthesizes image light in the respective colors emitted from the plurality of display panels 21. Furthermore, in one exemplary embodiment, the image light emitting device 20 may modulate laser light by a micromirror device.

The light-guiding optical system 30 includes, for example, a plurality of lenses 31, 32, and 33 and a mirror 35. The plurality of lenses 31, 32, and 33 constitute a projection system. Lens surfaces of the lenses 32 and 33 are, for example, a free-form surface. The mirror 35 projects the image light L0 that has passed through the lenses 31, 32, and 33 obliquely from the rear toward the light-guiding device 50. The light-guiding optical system 30 (projection optical system) can cause the center of the image light to be parallel with central optical axes of the image light L0 emitted from end portions at an angle of view. The light-guiding device 50 is a plate-shaped member having a thickness direction T in the anteroposterior direction Z.

Configuration of Light-Guiding Device 50

Figure 3:
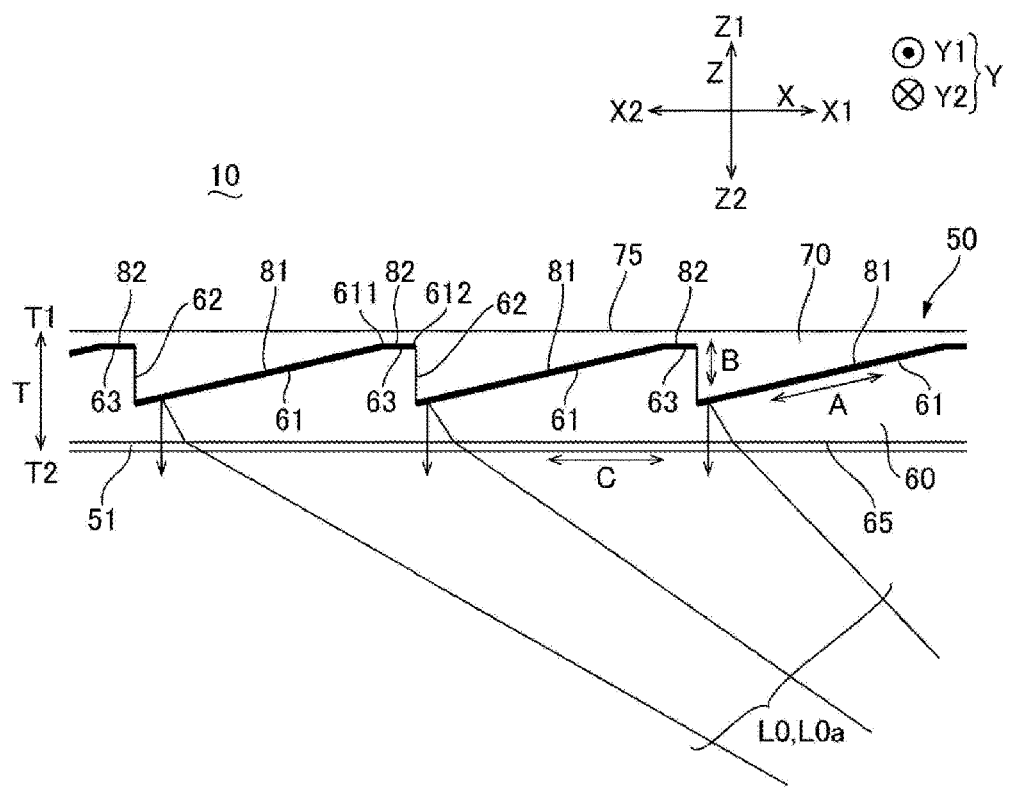
FIG. 3 is a schematic diagram of a light-guiding device illustrated in FIG. 2.
Figure 4:
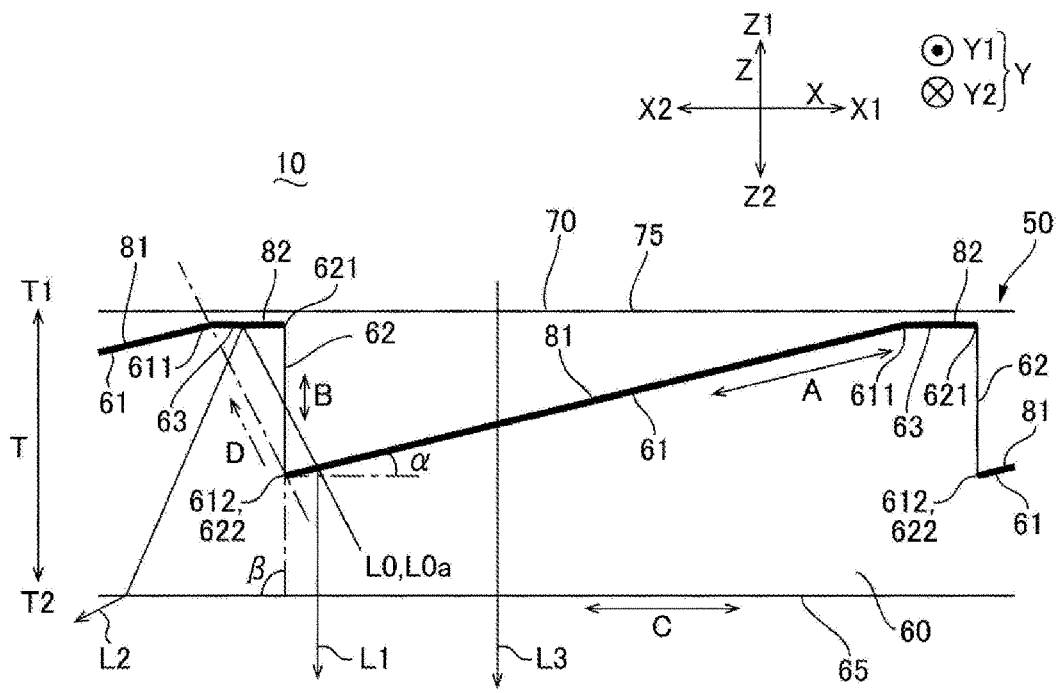
FIG. 4 is a schematic diagram of an enlarged part of the light-guiding device illustrated in FIG. 2.

FIG. 3 is a schematic diagram of the light-guiding device 50 illustrated in FIG. 2. FIG. 4 is a schematic diagram of an enlarged part of the light-guiding device 50 illustrated in FIG. 2. As illustrated in FIGS. 3 and 4, the light-guiding device 50 includes a first light-guiding body 60 having a plate shape and a second light-guiding body 70 that has a plate shape and is bonded to the first light-guiding body 60 on a first side T1 in the thickness direction T with an adhesive agent and the like. The first light-guiding body 60 and the second light-guiding body 70 extend in the horizontal direction X. The first light-guiding body 60 is made of a light transmissive member having a refractive index of n1. The second light-guiding body 70 is made of a light transmissive member having a refractive index of n2. In Exemplary Embodiment 1, the first light-guiding body 60 and the second light-guiding body 70 are made of light transmissive resin. The first light-guiding body 60 has the refractive index n1 different from the refractive index n2 of the second light-guiding body 70.

The first light-guiding body 60 includes, on the first side T1 in the thickness direction T, a plurality of first surfaces 61 each extending along a first direction A and a plurality of second surfaces 62 each extending along a second direction B intersecting the first direction A between adjacent first surfaces 61 among the plurality of first surfaces 61. The first light-guiding body 60 includes an end face 65 on a second side T2 in the thickness direction T. An antireflection layer 51 is formed on the end face 65. The end face 65 is parallel to a direction C (horizontal direction X) in which the plurality of first surface 61 and the plurality of second surfaces 62 are arranged. The first direction A in which the first surface 61 extends and the second direction B in which the second surface 62 extends are directions intersecting the end face 65. Note that, in one exemplary embodiment, the second surface 62 may be parallel to the vertical direction Y or may be inclined to the vertical direction Y.

The light-guiding device 50 includes a plurality of first half mirrors 81 contacting the plurality of respective first surfaces 61. The second light-guiding body 70 is disposed to contact the plurality of first half mirrors 81 and the plurality of second surfaces 62. The second light-guiding body 70 has an end face 75 on the first side T1 in the thickness direction T. The end face 75 is parallel to the direction C (horizontal direction X) in which the plurality of first surfaces 61 and the plurality of second surfaces 62 are arranged.

In the display section 10 having such a configuration, the image light L0 emitted from the light-guiding optical system 30 obliquely travels from the first side X1 (ear side) to the second side X2 (nose side) in the horizontal direction X toward the end face 65 of the first light-guiding body 60 in the light-guiding device 50, and is then incident on the end face 65. In the light-guiding device 50, the image light L0 incident on the end face 65 of the first light-guiding body 60 travels obliquely with respect to the end face 65 in the first light-guiding body 60, and is then incident on the first surface 61 (first half mirror 81). Therefore, a part of the image light L0 as indicated by an arrow L1 is reflected by the first half mirror 81 toward the opposite side from the second light-guiding body 70, and is then emitted from the end face 65 toward the eye E of the observer. Therefore, the observer can recognize an image.

Accordingly, the first surface 61 is inclined in a direction in which the first surface 61 on the first side X1 in the horizontal direction X is away from the end face 65 and on the second side X2 in the horizontal direction X is close to the end face 65. Also, as illustrated in FIG. 2, a beam of light of the image light L0 at the center at the angle of view is incident on a central portion of the end face 65 in the horizontal direction X, is emitted from the central portion in the horizontal direction X to a direction orthogonal to the end face 65, and then reaches the eye E. In contrast, a beam of light of the image light L0 at end portions at the angle of view is incident on end portion sides of the end face 65 in the horizontal direction X, is emitted from the end portion sides in the horizontal direction X to a direction obliquely to the end face 65, and then reaches the eye E. Therefore, in FIG. 4, an inclination angle α between each of the plurality of first surfaces 61 and the end face 65 is greater on the second side X2 in the horizontal direction X than on the first side X1. However, an angle β, between each of the plurality of second surfaces 62 and the end face 65 is constant in the horizontal direction X. Accordingly, in Exemplary Embodiment 1, the "direction along the first direction A" varies among the plurality of first surfaces 61, whereas the "direction along the second direction B" is identical among the plurality of second surfaces 62.

Note that, in the light-guiding device 50, a part of external light as indicated by an arrow L3 incident from the first side T1 in the thickness direction T (the second light-guiding body 70 side) on the first half mirror 81 passes through the first half mirror 81 and is emitted from the end face 65 toward the eye E of the observer. Therefore, the observer can recognize what is going on outside.

Configuration of Third Surface 63

In Exemplary Embodiment 1, in the light-guiding device 50 having such a configuration, as illustrated in FIG. 4, the first light-guiding body 60 includes a plurality of third surfaces 63 between adjacent first surface 61 and second surface 62 among the plurality of first surfaces 61 and the plurality of second surfaces 62. Each of the plurality of third surfaces 63 overlaps the second surface 62 in a direction intersecting the first direction A and the second direction B and in a direction along a third direction D in which two first surfaces 61 located on both sides of the second surface 62 do not overlap each other. In addition, each of the plurality of third surfaces 63 extends in a direction different from the first direction A.

In Exemplary Embodiment 1, each of the plurality of third surfaces 63 is provided, between adjacent first surface 61 and second surface 62 among the plurality of first surfaces and the plurality of second surfaces 62, between an end portion 611 of the first surface 61 on the first side T1 in the thickness direction T and an end portion 621 of the second surface 62 on the first side T1 in the thickness direction T. Each of the plurality of third surfaces 63 is parallel to the direction C in which the plurality of first surfaces 61 and the plurality of second surfaces 62 are arranged. In other words, each of the plurality of third surfaces 63 is parallel to the end face 65 of the first light-guiding body 60 and the end face 75 of the second light-guiding body 70.

In the light-guiding device 50 having such a configuration, the third direction D (direction in which the second surface 62 overlap the third surface 63) is a direction in which the image light L0 is incident on each of the plurality of first half mirrors 81 and is identical to a direction in which the image light L0 passes through the first half mirror 81 and then passes through the second surface 62 and travels.

In Exemplary Embodiment 1, a plurality of second half mirrors 82 contacting the plurality of respective third surfaces 63 are provided between the first light-guiding body 60 and the second light-guiding body 70. Therefore, the second light-guiding body 70 is disposed so as to contact the plurality of first half mirrors 81, the plurality of second surfaces 62, and the plurality of second half mirrors 82. The second half mirror 82 is connected to the first half mirror 81. In Exemplary Embodiment 1, the first half mirror 81 and the second half mirror 82 have the identical layer configuration and the identical reflectance. Thus, the external light indicated by the arrow L3 can be uniform. When the external light is uniform, diffraction is less likely to occur, and thus the observer can observe clear external light.

In steps of manufacturing the light-guiding device 50 having such a configuration, the first light-guiding body 60 including the first surface 61, the second surface 62, and the third surface 63 is formed by molding with a die, and then the first half mirror 81 and the second half mirror 82 are selectively formed by a photolithography technology so as to cover the first surface 61 and the third surface 63, respectively. Next, light transmissive resin is provided so as to cover the first half mirror 81, the second surface 62, and the second half mirror 82 and then solidified, and thus the second light-guiding body 70 is formed. Then, a surface of the second light-guiding body 70 on the opposite side from the first light-guiding body 60 is flattened, and thus the end face 75 is formed. Each of the first half mirror 81 and the second half mirror 82 is made of a dielectric multilayer film and a metal thin film such as an aluminum thin film. In Exemplary Embodiment 1, each of the first half mirror 81 and the second half mirror 82 is made of a dielectric multilayer film.

A method for pressing a die having molding surfaces corresponding to the first surface 61, the second surface 62, and the third surface 63 against light transmissive resin, then solidifying the resin, and forming the first light-guiding body 60 may be adopted. Also in this case, the first half mirror 81 and the second half mirror 82 are selectively formed by the photolithography technology so as to cover the first surface and the third surface 63, respectively. Next, light transmissive resin is provided so as to cover the first half mirror 81, the second surface 62, and the second half mirror 82 and then solidified, and thus the second light-guiding body 70 is formed. Then, a surface of the second light-guiding body 70 on the opposite side from the first light-guiding body 60 is flattened, and thus the end face 75 is formed.

Advantage of Exemplary Embodiment 1

As described above, in the light-guiding device 50 and the display section 10 (display device 100) in Exemplary Embodiment 1, the first light-guiding body 60 of the light-guiding device 50 includes the third surface 63. The third surface 63 extends, in a direction different from the first direction A, to a region overlapping the second surface 62 in the third direction D intersecting the first direction A and the second direction B. Adjacent first surfaces 61 do not overlap each other in the third direction D. Therefore, a part of the image light L0 incident on the first surface 61 passes through the first half mirror 81, then passes through the second surface 62, and is subsequently incident on the third surface 63 without being incident on an adjacent first surface 61 (first half mirror 81). Accordingly, the light as indicated by an arrow L2 that has passed through the first half mirror 81 is emitted to a direction different from light reflected by the first half mirror 81, and is not incident on the eye E of the observer. Hence, even when the image light L0 that has passed through the first half mirror 81 is refracted by the first surface 61, the second surface 62, and the end face 65 in a case where the first light-guiding body 60 has the refractive index n1 different from the refractive index n2 of the second light-guiding body 70, a ghost due to such refraction is less likely to be recognized by the observer.

Since the second half mirror 82 is provided on the third surface 63, a part of external light incident on the third surface 63 from the first side T1 in the thickness direction T passes through the second half mirror 82, is emitted from the end face 65 of the first light-guiding body 60, and then reaches the eye of the observer. Even when the image light L0 that has passed through the first half mirror 81 and the second surface 62 reaches the third surface 63, the light can be prevented from being emitted from the light-guiding device 50 to the first side T1 in the thickness direction T.

The third surface 63 is provided between the end portion 611 of the first surface 61 on the first side T1 in the thickness direction T and the end portion 621 of the second surface 62 on the first side T1 in the thickness direction T. Thus, the third surface 63 can further extend an extending length of the first surface 61 on the first side T1 in the thickness direction T than a case where the third surface 63 is provided between an end portion 612 of the first surface 61 on the second side T2 in the thickness direction T and an end portion 622 of the second surface 62 on the second side T2 in the thickness direction T. Therefore, the amount of light reflected by the first half mirror 81 and emitted from the end face 65 can be increased.

Note that the entire region overlapping the second surface 62 in the third direction D is the third surface 63 in Exemplary Embodiment 1, but also when a part of the region overlapping the second surface 62 in the third direction D is the third surface 63, an occurrence of a ghost can be reduced. For example, a ratio of brightness of a ghost and brightness of an external environment is lower when the use in a bright environment is assumed. Thus, an occurrence of a ghost can be sufficiently reduced with the part of the region overlapping the second surface 62 in the third direction D serving as the third surface 63. In contrast, for the use in a dark environment, a ghost is more likely to be conspicuous, and thus the entire region overlapping the second surface 62 in the third direction D may be the third surface 63 as in Exemplary Embodiment 1. However, when a range wider than the region overlapping the second surface 62 in the third direction D is the third surface 63, an image becomes dark. Thus, a range identical to or smaller than the region overlapping the second surface 62 in the third direction D may be the third surface 63.

Modified Example 1 of Exemplary Embodiment 1

The first half mirror 81 has a reflectance identical to a reflectance of the second half mirror 82 in Exemplary Embodiment 1, but the first half mirror 81 may have a reflectance different from a reflectance of the second half mirror 82. For example, when the second half mirror 82 has a reflectance lower than a reflectance of the first half mirror 81, the amount of light of a ghost due to the beam of light indicated by the arrow L2 can be reduced. The configuration is not limited to Exemplary Embodiment 1 and may be applied to each exemplary embodiment described below.

Modified Example 2 of Exemplary Embodiment 1

A half mirror is not formed on the second surface 62 in Exemplary Embodiment 1, but a half mirror (fourth half mirror) may be provided so as to contact the second surface 62. The fourth half mirror has a layer in a configuration identical to or different from the configuration of the first half mirror 81 and the second half mirror 82. The configuration is not limited to Exemplary Embodiment 1 and may be applied to each exemplary embodiment described below.

Exemplary Embodiment 2

Figure 5:
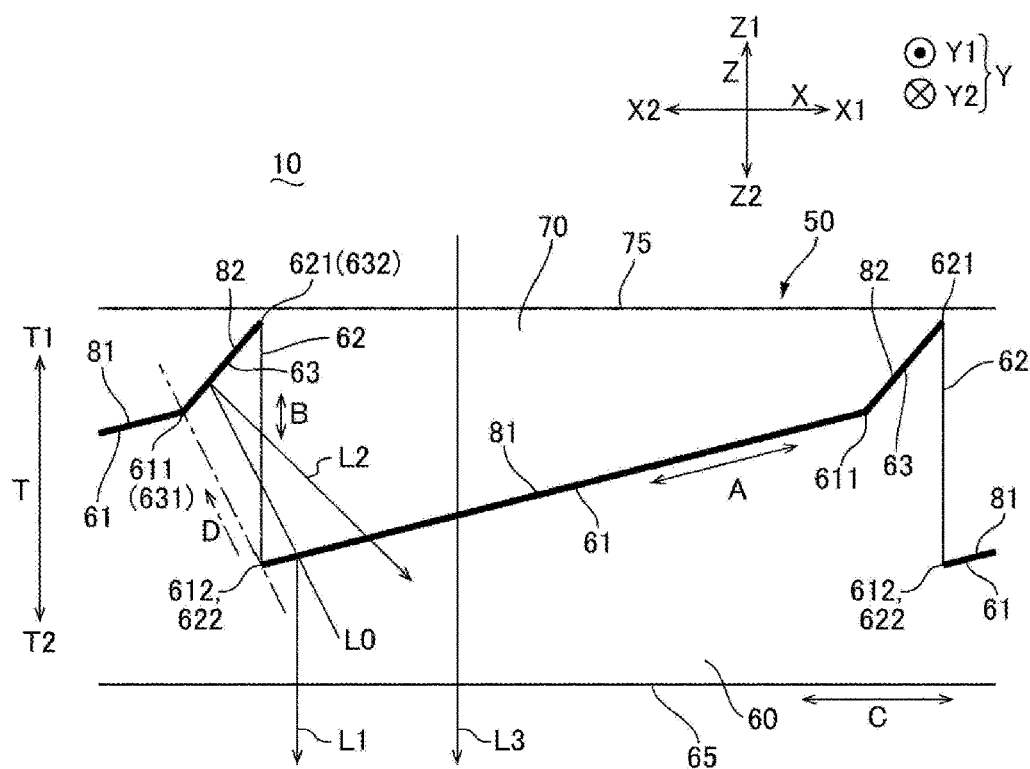
FIG. 5 is a schematic diagram of a light-guiding device according to Exemplary Embodiment 2 of the disclosure.

FIG. 5 is a schematic diagram of a light-guiding device 50 according to Exemplary Embodiment 2 of the disclosure. Note that the basic configuration of Exemplary Embodiment 2 and exemplary embodiments described below is the same as the configuration of Exemplary Embodiment 1, and thus common portions have the same reference signs and description of the common portions will be omitted.

In Exemplary Embodiment 1, the third surface 63 is parallel to the end face 65 of the first light-guiding body 60 and the end face 75 of the second light-guiding body 70. As illustrated in FIG. 5, the third surface 63 is inclined to the end face 65 of the first light-guiding body 60 and the end face 75 of the second light-guiding body 70. In Exemplary Embodiment 2, the third surface 63 is inclined such that a first boundary 631 between the first surface 61 and the third surface 63 (the end portion 611 of the first surface 61 on the first side T1 in the thickness direction T) is located closer to the end face 65 than a second boundary 632 between the second surface 62 and the third surface 63 (the end portion 621 of the second surface 62 on the first side T1 in the thickness direction T). In such a configuration, the light as indicated by an arrow L2 that has passed through the first half mirror 81 is reflected by the second half mirror 82 of the third surface 63 into a direction opposite to a direction in which the image light L0 travels in the first light-guiding body 60. Thus, the light that has passed through the first half mirror 81 is less likely to be incident on the eye E of the observer than Exemplary Embodiment 1, and thus a ghost is less likely to be recognized by the observer.

Exemplary Embodiment 3

Figure 6:
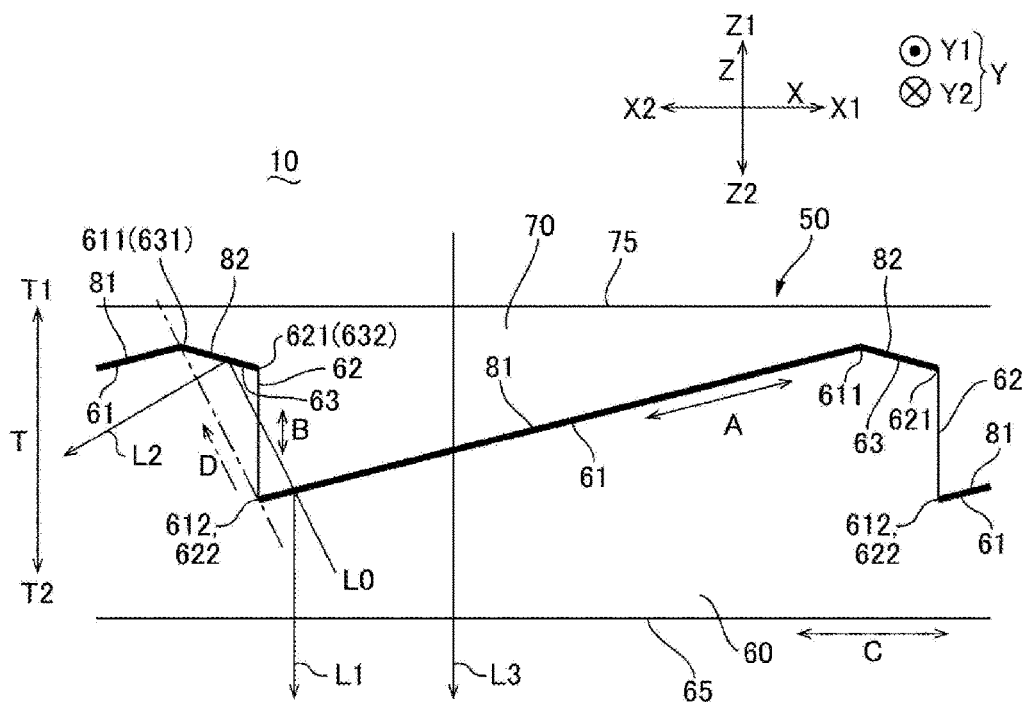
FIG. 6 is a schematic diagram of a light-guiding device according to Exemplary Embodiment 3 of the disclosure.

FIG. 6 is a schematic diagram of a light-guiding device 50 according to Exemplary Embodiment 3 of the disclosure. As illustrated in FIG. 6, also in Exemplary Embodiment 3, the third surface 63 is inclined to the end face 65 of the first light-guiding body 60 and the end face 75 of the second light-guiding body 70. In Exemplary Embodiment 3, the third surface is inclined such that the first boundary 631 between the first surface 61 and the third surface 63 is located farther from the end face 65 than the second boundary 632 between the second surface 62 and the third surface 63. In such a configuration, the light as indicated by an arrow L2 that has passed through the first half mirror 81 is reflected by the second half mirror 82 of the third surface 63 into a direction greatly away from the light reflected by the first half mirror 81. Thus, the light that has passed through the first half mirror 81 is less likely to be incident on the eye E of the observer than Exemplary Embodiment 1, and thus a ghost is less likely to be recognized by the observer.

Exemplary Embodiment 4

Figure 7:
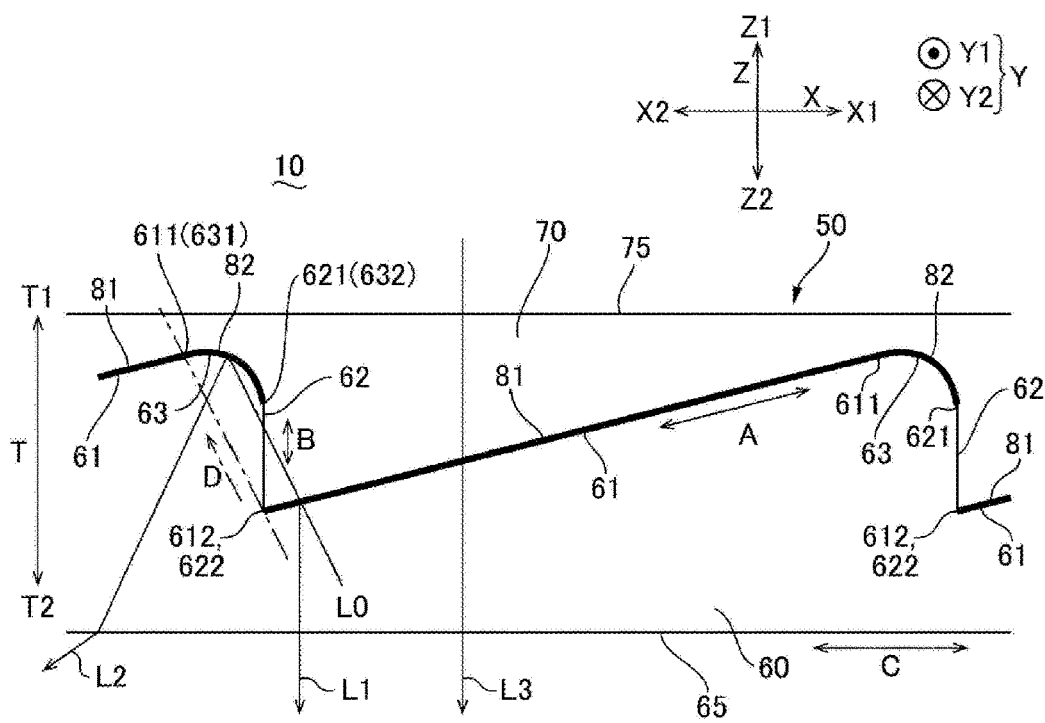
FIG. 7 is a schematic diagram of a light-guiding device according to Exemplary Embodiment 4 of the disclosure.

FIG. 7 is a schematic diagram of a light-guiding device 50 according to Exemplary Embodiment 4 of the disclosure. In Exemplary Embodiments 1, 2, and 3, the third surface 63 is a plane surface. As illustrated in FIG. 7, the third surface 63 may be a curved surface. In Exemplary Embodiment 4, the third surface 63 is a protruding curved surface in which a central portion between the first boundary 631 between the first surface 61 and the third surface 63 and the second boundary 632 between the second surface 62 and the third surface 63 protrudes farther than the first boundary 631 and the second boundary 632. In such a configuration, the light that has passed through the first half mirror 81 is dispersed and reflected by the third surface 63. Therefore, unlike the case where the third surface 63 is a plane surface, the light that has passed through the first half mirror 81 is less likely to be incident on the eye E of the observer regardless of an inclination of the third surface 63 and the like, and thus a ghost is less likely to be recognized by the observer.

Exemplary Embodiment 5

Figure 8:
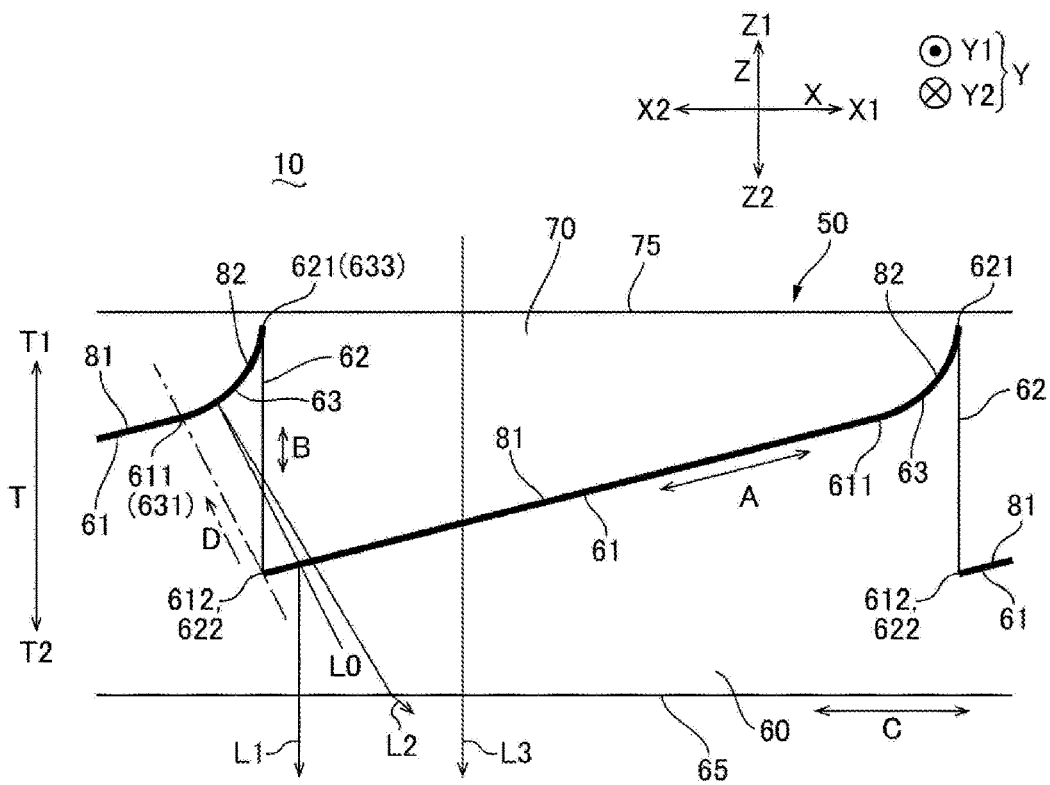
FIG. 8 is a schematic diagram of a light-guiding device according to Exemplary Embodiment 5 of the disclosure.

FIG. 8 is a schematic diagram of a light-guiding device 50 according to Exemplary Embodiment 5 of the disclosure. As illustrated in FIG. 8, in Exemplary Embodiment 5, the third surface 63 is a recessed curved surface in which the central portion between the first boundary 631 between the first surface 61 and the third surface 63 and the second boundary 632 between the second surface 62 and the third surface 63 is recessed farther than the first boundary 631 and the second boundary 632. In such a configuration, the light that has passed through the first half mirror 81 is dispersed and reflected by the third surface 63. Therefore, unlike the case where the third surface 63 is a plane surface, the light that has passed through the first half mirror 81 is less likely to be incident on the eye E of the observer regardless of an inclination of the third surface 63 and the like, and thus a ghost is less likely to be recognized by the observer.

Exemplary Embodiment 6

Figure 9:
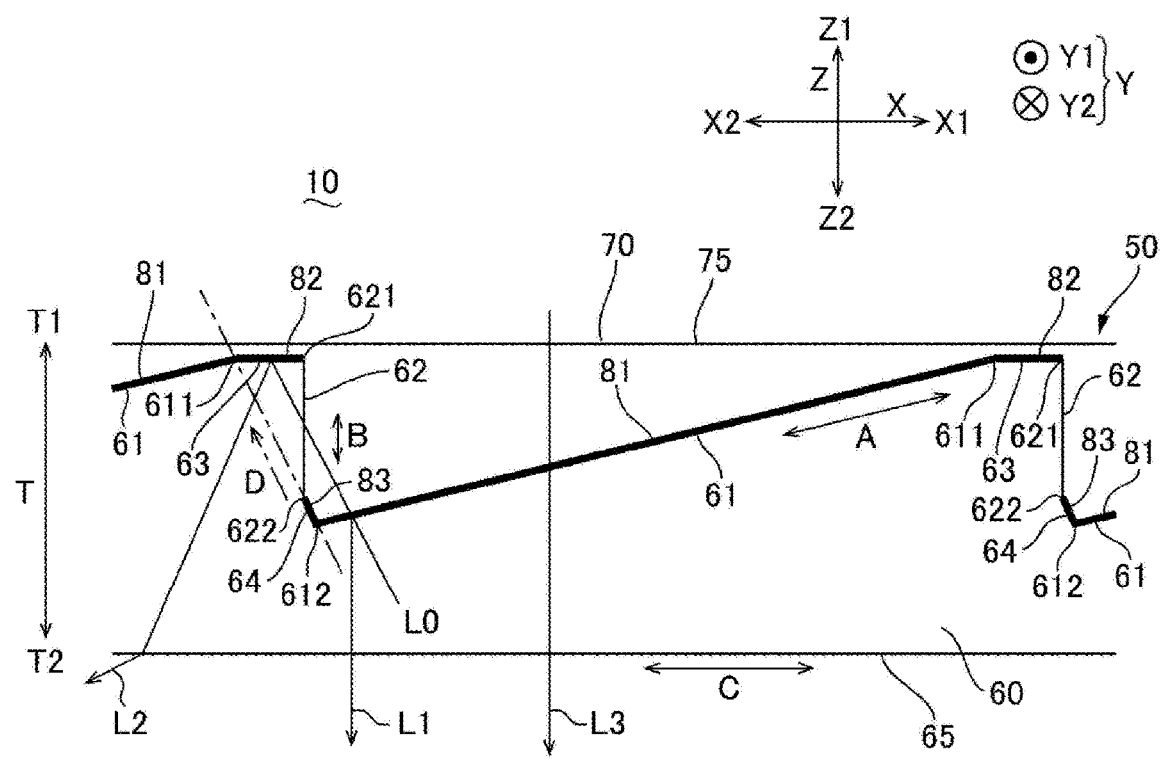
FIG. 9 is a schematic diagram of a light-guiding device according to Exemplary Embodiment 6 of the disclosure.

FIG. 9 is a schematic diagram of a light-guiding device 50 according to Exemplary Embodiment 6 of the disclosure. As illustrated in FIG. 9, in Exemplary Embodiment 6, the first light-guiding body 60 includes a fourth surface 64 extending in the third direction D between the end portion 612 of the first surface 61 on the second side T2 in the thickness direction T and the end portion 622 of the second surface 62 on the second side T2 in the thickness direction T between adjacent first surface 61 and second surface 62 among the plurality of first surfaces 61 and the plurality of second surfaces 62. A third half mirror 83 is formed on the fourth surface 64 and is connected to the first half mirror 81. The third half mirror 83 has a layer in a configuration identical to or different from the configuration of the first half mirror 81 and the second half mirror 82.

In such a configuration, a length of the second surface 62 in the second direction B can be shortened, and thus an extending distance of the third surface 63 can be shortened. Therefore, an extending length of the first surface 61 on the first side T1 in the thickness direction T can be extended, and thus the amount of light reflected by the first half mirror 81 and emitted from the end face 65 can be increased. Note that, in Exemplary Embodiment 6, the fourth surface 64 is provided based on Exemplary Embodiment 1, but the fourth surface 64 may be provided based on Exemplary Embodiments 2 to 5.

Exemplary Embodiment 7

Figure 10:
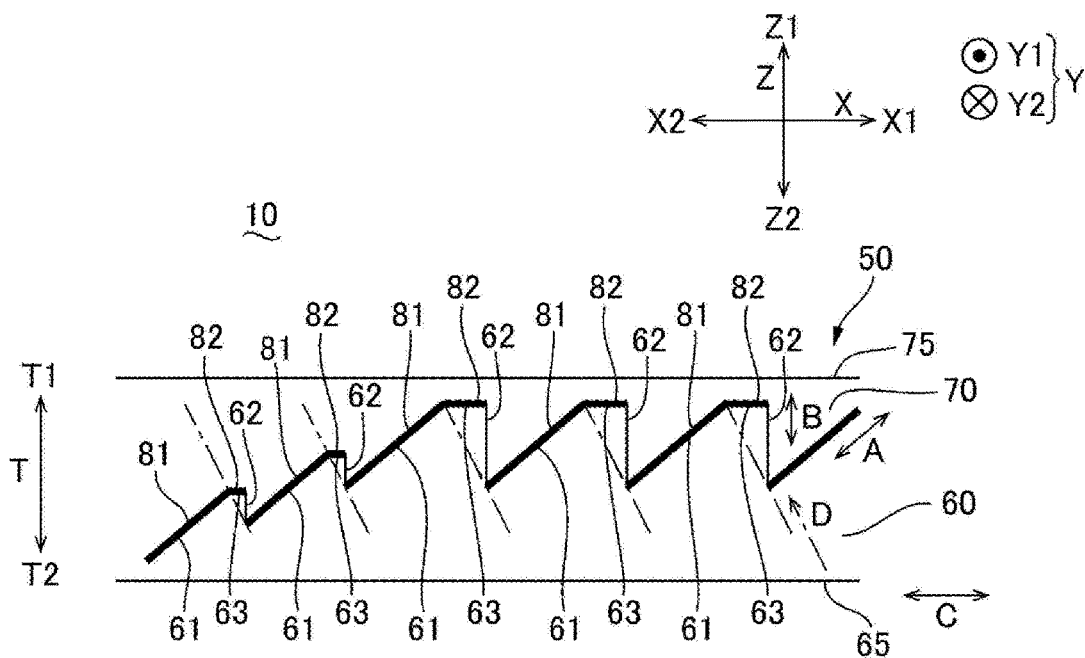
FIG. 10 is a schematic diagram of a light-guiding device according to Exemplary Embodiment 7 of the disclosure.

FIG. 10 is a schematic diagram of a light-guiding device 50 according to Exemplary Embodiment 7 of the disclosure. In Exemplary Embodiments 1 to 6, the positions of the plurality of first surfaces 61 (first half mirrors 81) in the thickness direction T are identical with reference to the end face 65. As illustrated in FIG. 10, positions of the plurality of first surfaces 61 (first half mirrors 81) in the thickness direction T vary along a direction in which the plurality of first surfaces 61 are arranged with reference to the end face 65. More specifically, the first surface 61 provided on the second side X2 in the horizontal direction X is located closer to the end face 65 than the first surface 61 provided on the first side X1 in the horizontal direction X. In accordance with the configuration, lengths of the plurality of second surfaces 62 in the second direction B also vary along the direction in which the plurality of first surfaces 61 are arranged. More specifically, the second surface 62 provided on the second side X2 in the horizontal direction X has a length, in the second direction B, shorter than a length of the second surface 62 provided on the first side X1 in the horizontal direction X. As a result, lengths of the third surfaces 63 also vary along the direction in which the plurality of first surfaces 61 are arranged. More specifically, the third surface 63 provided on the second side X2 in the horizontal direction X has a length, in the direction in which the plurality of first surfaces 61 are arranged, shorter than a length of the third surface 63 provided on the first side X1 in the horizontal direction X.

Also in such a configuration, the light that has passed through the first half mirror 81 is emitted to a direction different from light reflected by the first half mirror 81, and is not incident on the eye E of the observer. Thus, an occurrence of a ghost can be prevented. Note that, in Exemplary Embodiment 7, a position of the first surface 61 is changed based on Exemplary Embodiment 1, but a position of the first surface 61 may be changed based on Exemplary Embodiments 2 to 6.

Exemplary Embodiment 8

Figure 11A:
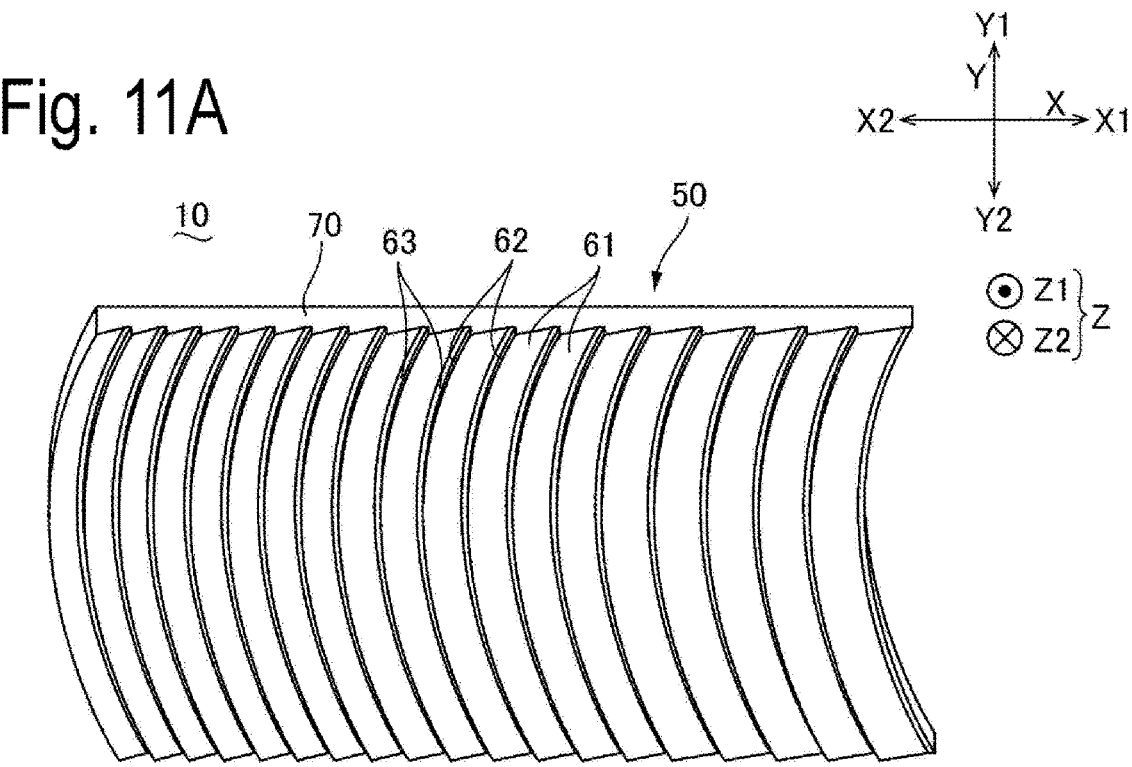
FIGS. 11A and 11B are schematic diagrams of a light-guiding device according to Exemplary Embodiment 8 of the disclosure.
Figure 11B:
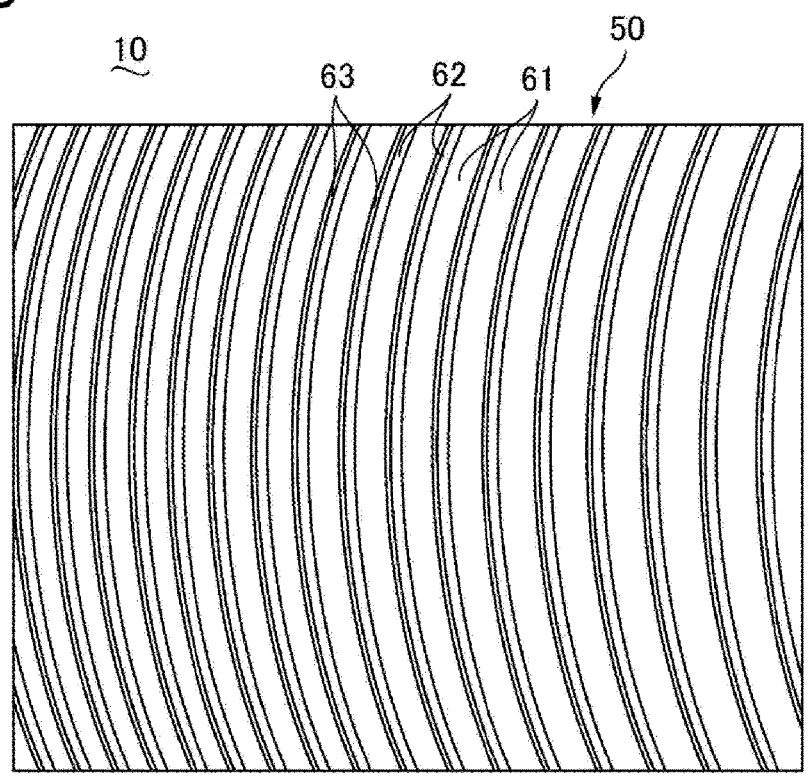
Figure 12:
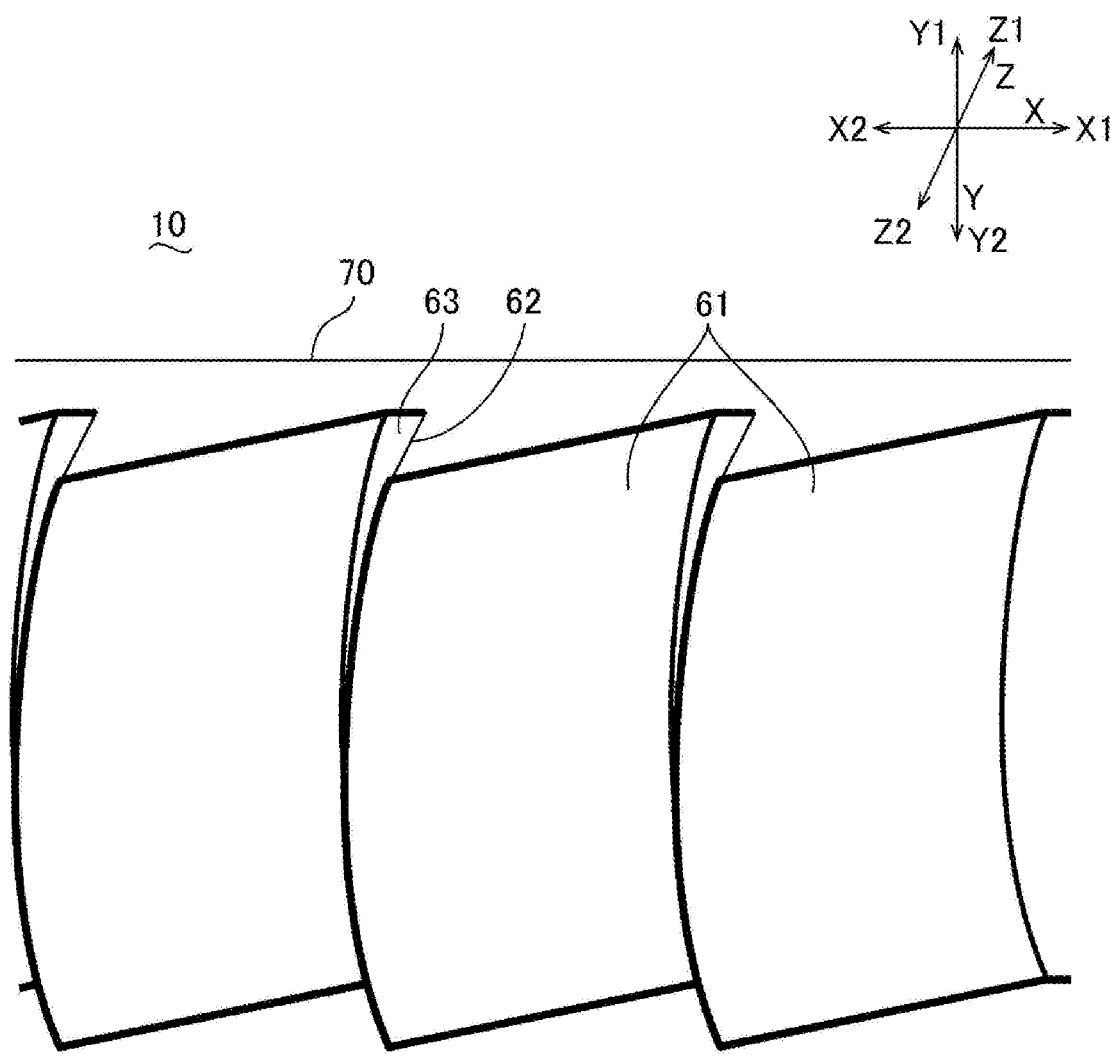
FIG. 12 is a schematic diagram illustrating an enlarged part of a first surface and the like of the light-guiding device illustrated in FIGS. 11A and 11B.

FIGS. 11A and 11B are schematic diagrams of a light-guiding device 50 according to Exemplary Embodiment 8 of the disclosure. FIGS. 11A and 11B respectively illustrate a perspective view A and a front view B in a state where the first light-guiding device 60 is not illustrated. FIG. 12 is a schematic diagram illustrating an enlarged part of the first surface 61 and the like of the light-guiding device 50 illustrated in FIGS. 11A and 11B.

As illustrated in FIGS. 11A, 11B, and 12, each of the plurality of first surfaces 61 is a recessed curved surface being recessed toward the second light-guiding body 70 in the light-guiding device 50 in Exemplary Embodiment 8. In Exemplary Embodiment 8, each of the plurality of first surfaces 61 is a recessed curved surface extending while being curved in a direction (vertical direction Y) orthogonal to the horizontal direction X. Therefore, each of the plurality of first surfaces 61 is also recessed in a direction in which the plurality of first surfaces 61 and the plurality of second surfaces 62 are arranged (horizontal direction X). In Exemplary Embodiment 8, the second surface 62 also extends while being curved in the vertical direction Y along the first surface 61. Further, the third surface 63 also extends while being curved in the vertical direction Y along the first surface and the second surface 62. Therefore, the entire light-guiding device 50 extends while being curved in the vertical direction Y. Accordingly, even when the first surface 61 is curved, an increase in a thickness of the light-guiding device (thickness in the anteroposterior direction Z/length in a direction in which the first light-guiding body 60 overlaps the second light-guiding body 70) can be prevented.

In Exemplary Embodiment 8, the plurality of first surfaces 61 have the identical curvature. However, widths of the plurality of first surfaces 61 vary along the horizontal direction X.

The light-guiding device 50 having such a configuration can achieve condensing light incident on the first surface 61 into the vertical direction Y, and thus the light incident on the light-guiding device 50 can be efficiently caused to be incident on the eye of the observer.

Exemplary Embodiment 9

Figure 13A:
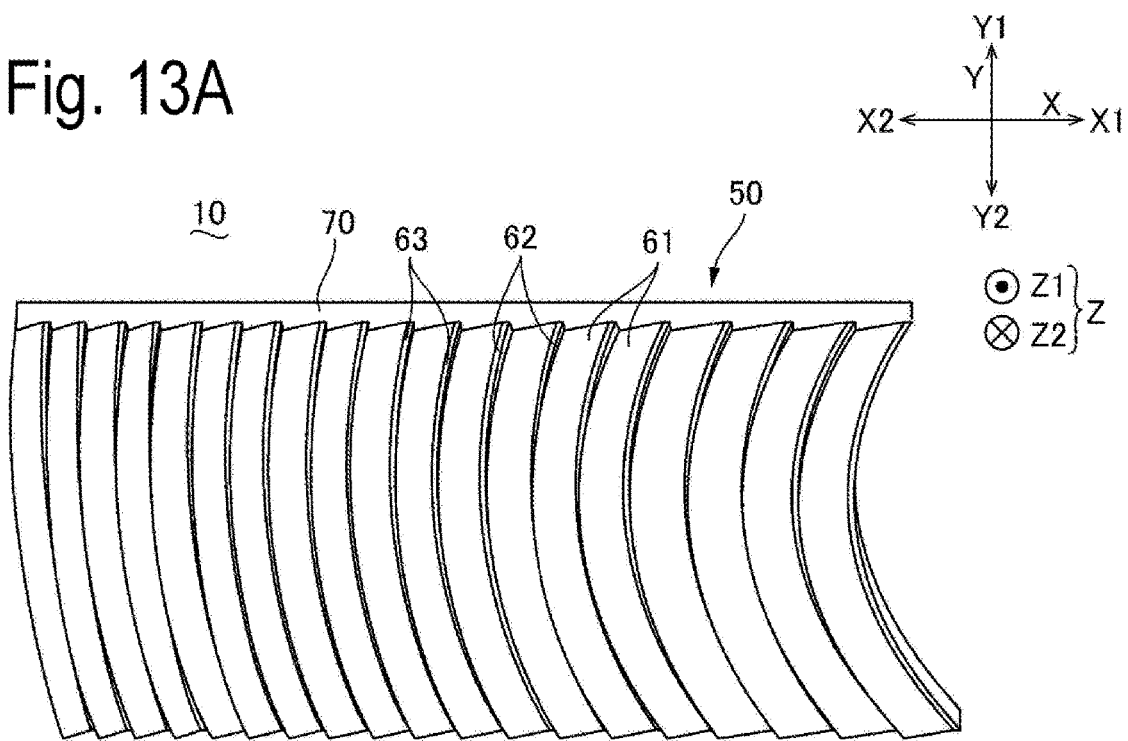
FIGS. 13A and 13B are schematic diagrams of a light-guiding device according to Exemplary Embodiment 9 of the disclosure.
Figure 13B:
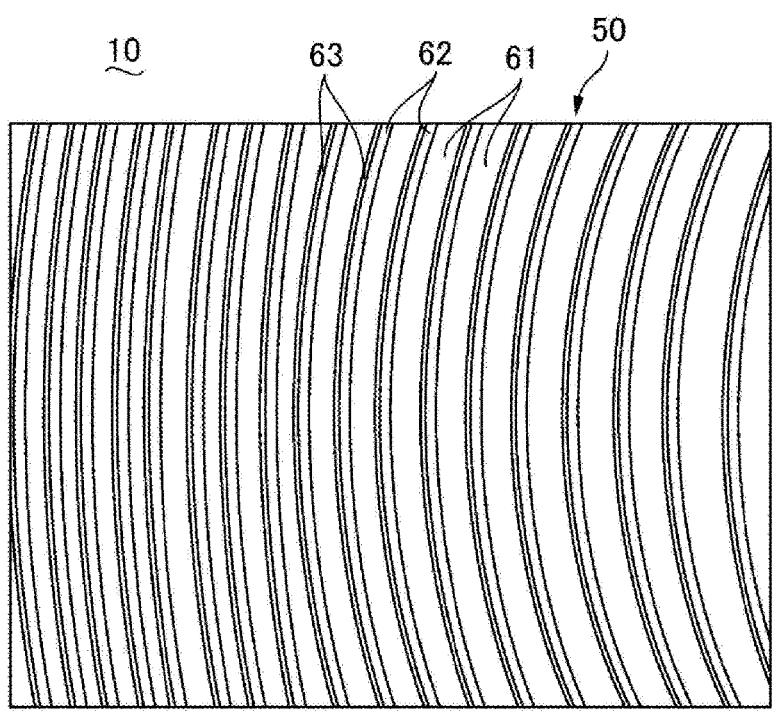
Figure 14:
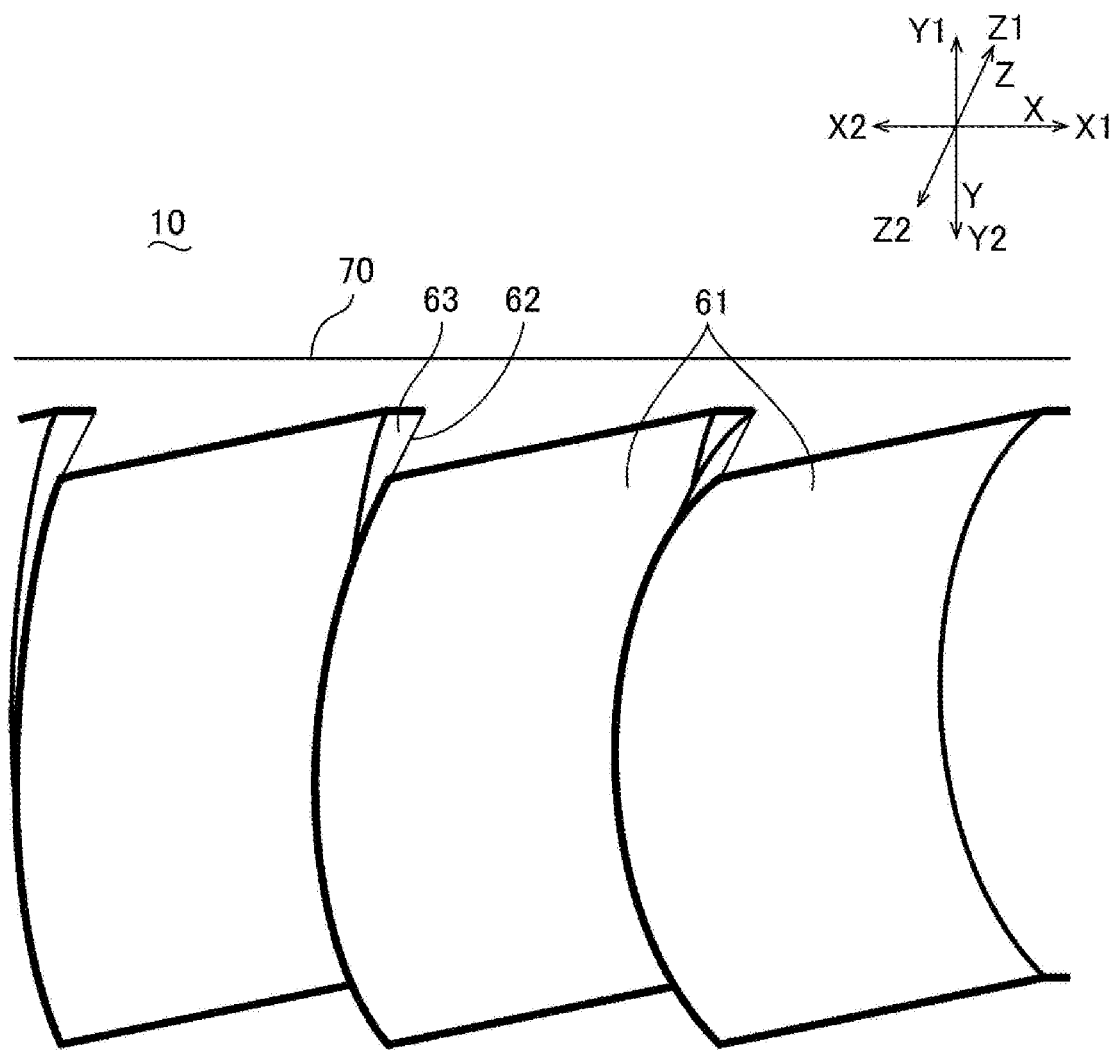
FIG. 14 is a schematic diagram illustrating an enlarged part of a first surface and the like of the light-guiding device illustrated in FIGS. 13A and 13B.
Figure 15A:
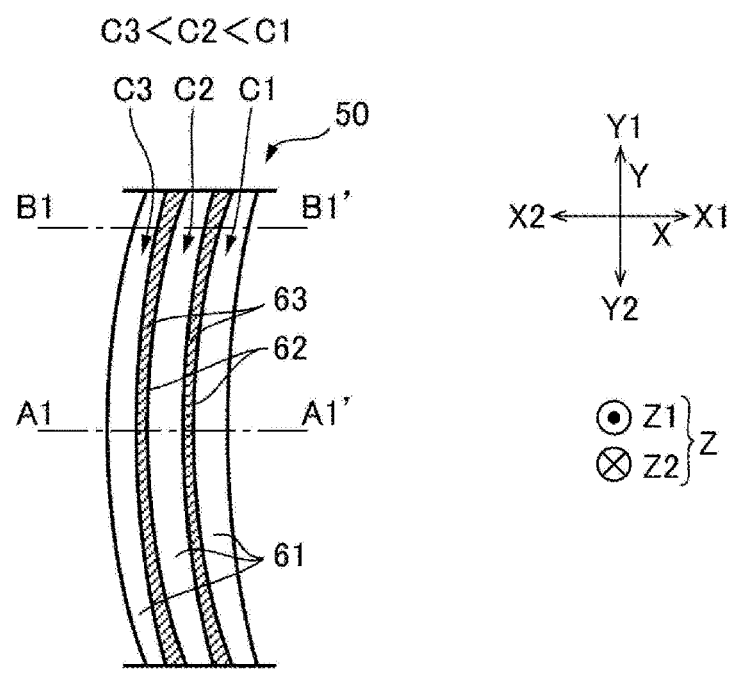
FIGS. 15A, 15B, and 15C are schematic diagrams each illustrating a configuration of a third surface and the like of the light-guiding device illustrated in FIGS. 13A and 13B.
Figure 15B:
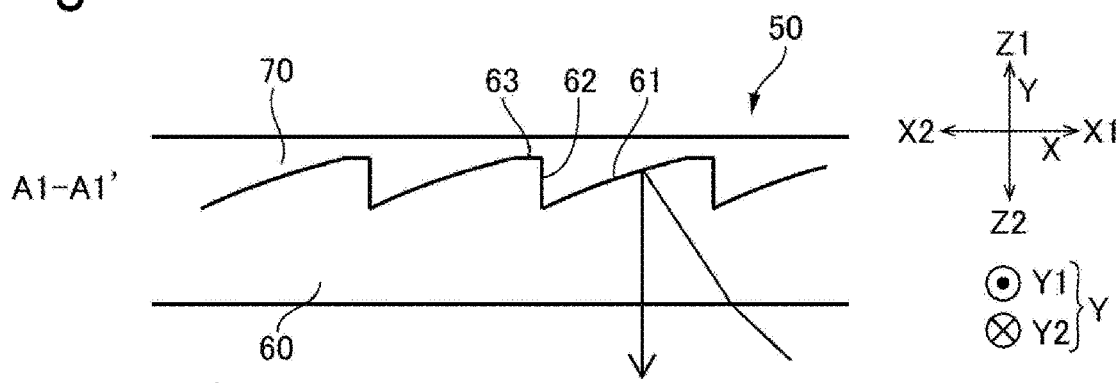
Figure 15C:
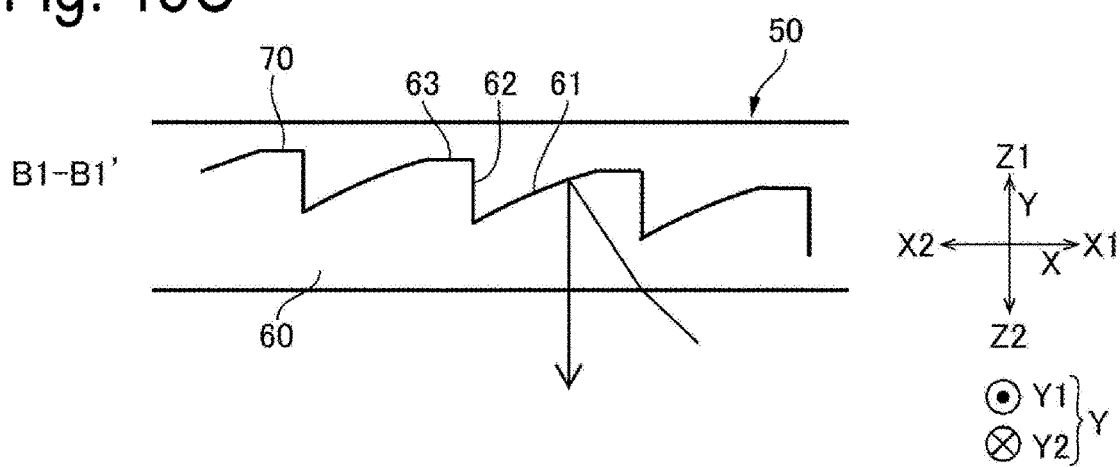

FIGS. 13A and 13B are schematic diagrams of a light-guiding device 50 according to Exemplary Embodiment 9 of the disclosure. FIGS. 13A and 13B respectively illustrate a perspective view A and a front view B in a state where the first light-guiding device 60 is not illustrated. FIG. 14 is a schematic diagram illustrating an enlarged part of the first surface 61 and the like of the light-guiding device 50 illustrated in FIGS. 13A and 13B. FIGS. 15A, 15B, and 15C are schematic diagrams each illustrating a configuration of the third surface 63 and the like of the light-guiding device 50 illustrated in FIGS. 13A and 13B. FIGS. 15A, 15B, and 15C respectively illustrate a front view A illustrating a width of the third surface 63, a cross-sectional diagram B taken along A1-A1', and a cross-sectional diagram C taken along B1-B1'. Note that, the third surface 63 is diagonally shaded in the front view A in FIG. 15A.

As illustrated in FIGS. 13A, 13B, 14, 15A, 15B, and 15C, each of the plurality of first surfaces 61 is a recessed curved surface being recessed toward the second light-guiding body 70 also in the light-guiding device 50 in Exemplary Embodiment 9, similarly to Exemplary Embodiment 8. In Exemplary Embodiment 9, each of the plurality of first surfaces 61 is a recessed curved surface extending while being curved in the direction (vertical direction Y) orthogonal to the horizontal direction X. Therefore, each of the plurality of first surfaces 61 is also recessed in the direction in which the plurality of first surfaces 61 and the plurality of second surfaces 62 are arranged (horizontal direction X). In Exemplary Embodiment 9, the second surface 62 also extends while being curved in the vertical direction Y along the first surface 61. Further, the third surface 63 also extends while being curved in the vertical direction Y along the first surface 61 and the second surface 62.

Herein, the plurality of first surfaces 61 each have a curvature decreasing in the order from the right side X1 to the left side X2 in the horizontal direction X. In other words, assuming that respective curvatures of the first surfaces 61 are C1, C2, and C3, the amount of the curvature decreases in the order of the curvature C1, the curvature C2, and the curvature C3. Further, the second surface 62 and the third surface 63 are curved along adjacent first surfaces 61.

In Exemplary Embodiment 9, the second surface 62 between the first surfaces 61 having different curvatures has a wide width at both ends in the vertical direction Y and a small width at a central portion. In accordance with the shape of the second surface 62, the third surface 63 also has a wide width at both ends in the vertical direction Y and a small width at a central portion.

Exemplary Embodiment 10

Figure 16A:
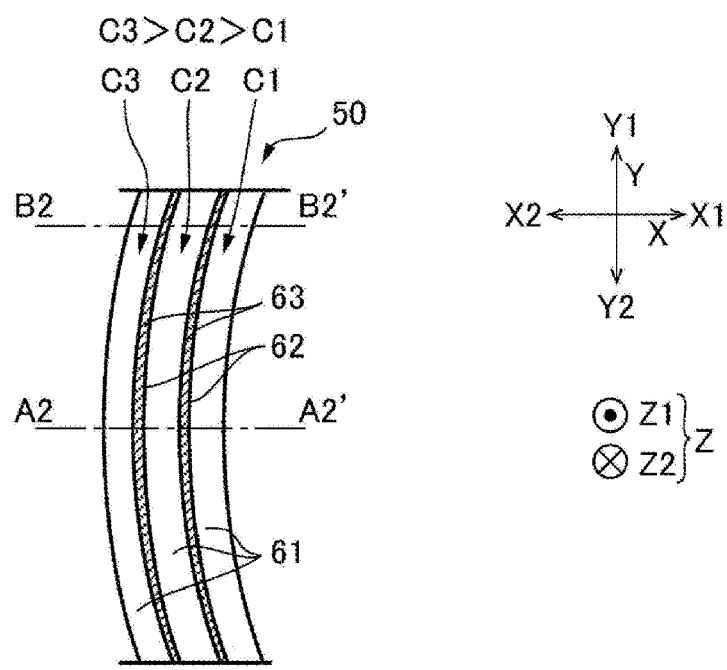
FIGS. 16A, 16B, and 16C are schematic diagrams each illustrating a configuration of a third surface and the like of a light-guiding device according to Exemplary Embodiment 10 of the disclosure.
Figure 16B:
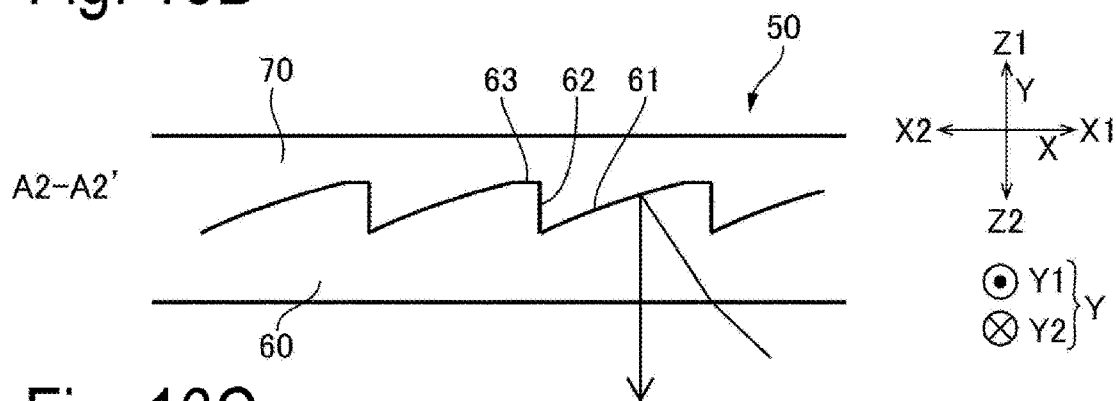
Figure 16C:
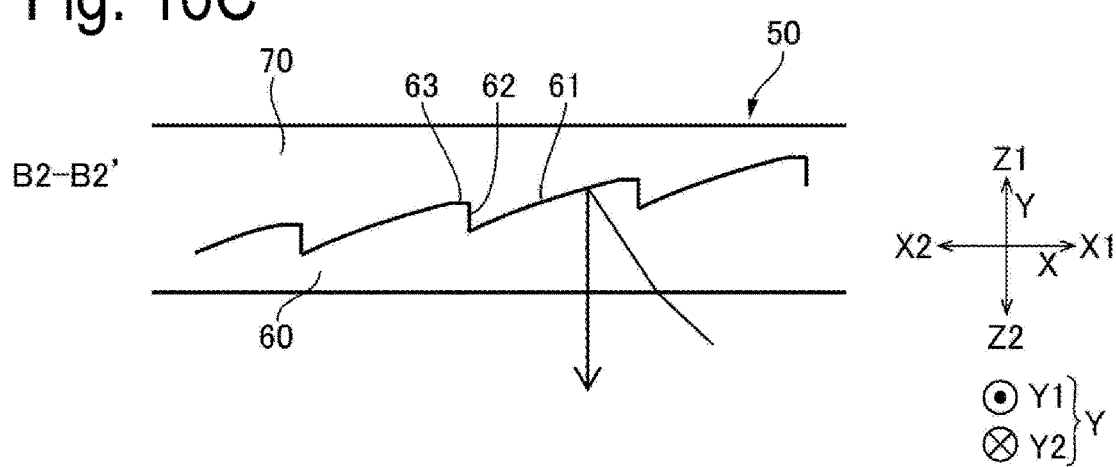

FIGS. 16A, 16B, and 16C are schematic diagrams each illustrating a configuration of the third surface 63 and the like of the light-guiding device 50 according to Exemplary Embodiment 10 of the disclosure. FIGS. 16A, 16B, and 16C respectively illustrate a front view A illustrating a width of the third surface 63, a cross-sectional diagram B taken along A1-A1', and a cross-sectional diagram C taken along B1-B1'. Note that, the third surface 63 is diagonally shaded in the front view A in FIG. 16A. As illustrated in FIGS. 16A, 16B, and 16C, each of the plurality of first surfaces 61 is a recessed curved surface being recessed toward the second light-guiding body 70 also in the light-guiding device 50 in Exemplary Embodiment 10, similarly to Exemplary Embodiments 8 and 9. In Exemplary Embodiment 10, each of the plurality of first surfaces 61 is a recessed curved surface extending while being curved in the direction (vertical direction Y) orthogonal to the horizontal direction X. Therefore, each of the plurality of first surfaces 61 is also recessed in the direction in which the plurality of first surfaces 61 and the plurality of second surfaces 62 are arranged (horizontal direction X). In Exemplary Embodiment 10, the second surface 62 also extends while being curved in the vertical direction Y along the first surface 61. Further, the third surface 63 also extends while being curved in the vertical direction Y along the first surface 61 and the second surface 62.

Herein, the plurality of first surfaces 61 each have a curvature increasing in the order from the right side X1 to the left side X2 in the horizontal direction X. In other words, assuming that respective curvatures of the first surfaces 61 are C1, C2, and C3, the amount of the curvature decreases in the order of the curvature C3, the curvature C2, and the curvature C1. Further, the second surface 62 and the third surface 63 are curved along adjacent first surfaces 61.

In Exemplary Embodiment 10, the second surface 62 between the first surfaces 61 having different curvatures has a small width at both ends in the vertical direction Y and a wide width at a central portion. In accordance with the shape of the second surface 62, the third surface 63 also has a small width at both ends in the vertical direction Y and a wide width at a central portion. Note that the aspects described in Exemplary Embodiments 8, 9, and 10 are applicable to Exemplary Embodiment 1 of the disclosure and may also be applied to any exemplary embodiments of the disclosure.

Exemplary Embodiment 11

Figure 17:
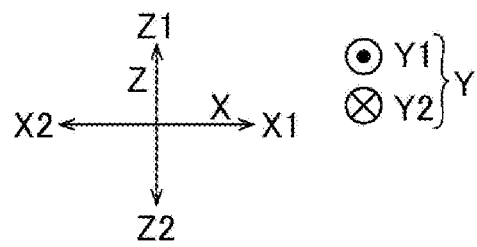
FIG. 17 is a schematic diagram of a light-guiding device according to Exemplary Embodiment 11 of the disclosure.
Figure 17:
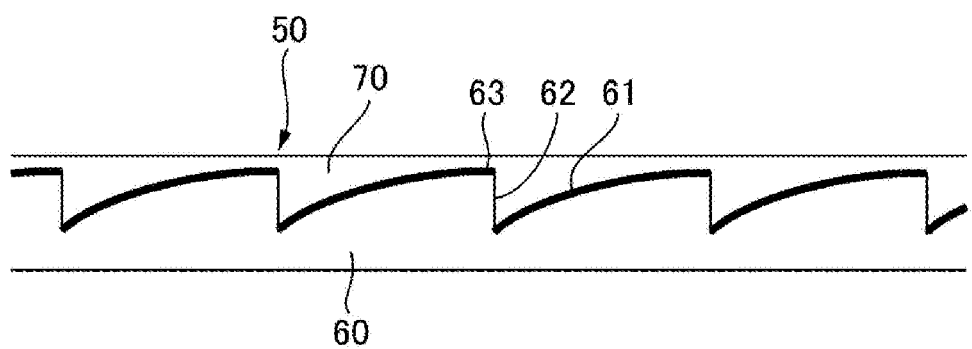

FIG. 17 is a schematic diagram of a light-guiding device 50 according to Exemplary Embodiment 11 of the disclosure. In Exemplary Embodiments 8 to 10, each of the plurality of first surfaces 61 extends while being curved in the direction (vertical direction Y) orthogonal to the horizontal direction X so as to be a recessed curved surface being recessed in the direction in which the plurality of first surfaces 61 and the plurality of second surfaces 62 are arranged (horizontal direction X). As illustrated in FIG. 17, each of the plurality of first surfaces 61 may extend while being curved in the direction in which the plurality of first surfaces 61 and the plurality of second surfaces 62 are arranged (horizontal direction X).

Exemplary Embodiment 12

Figure 18:
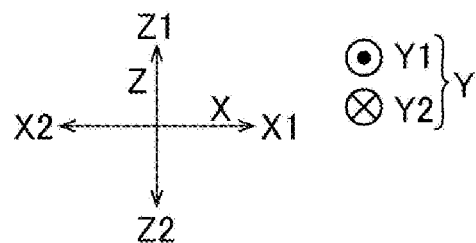
FIG. 18 is a schematic diagram of a light-guiding device according to Exemplary Embodiment 12 of the disclosure.
Figure 18:
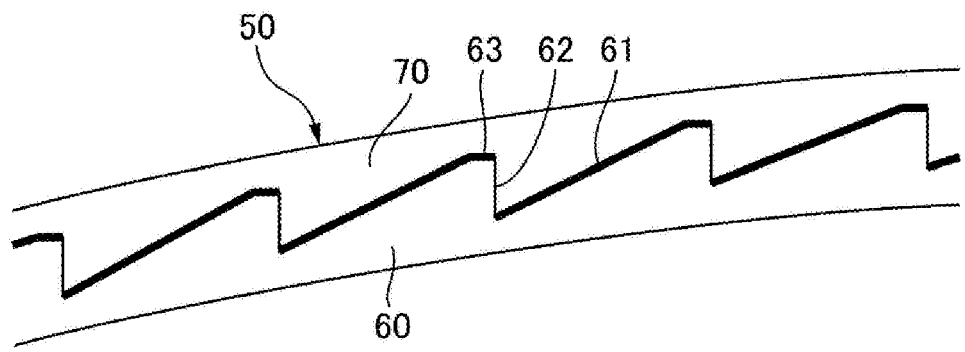

FIG. 18 is a schematic diagram of a light-guiding device 50 according to Exemplary Embodiment 12 of the disclosure. As illustrated in FIG. 18, the entire light-guiding device 50 may extend while being curved in the direction in which the plurality of first surfaces 61 and the plurality of second surfaces 62 are arranged (horizontal direction X).

Exemplary Embodiment 13

Figure 19:
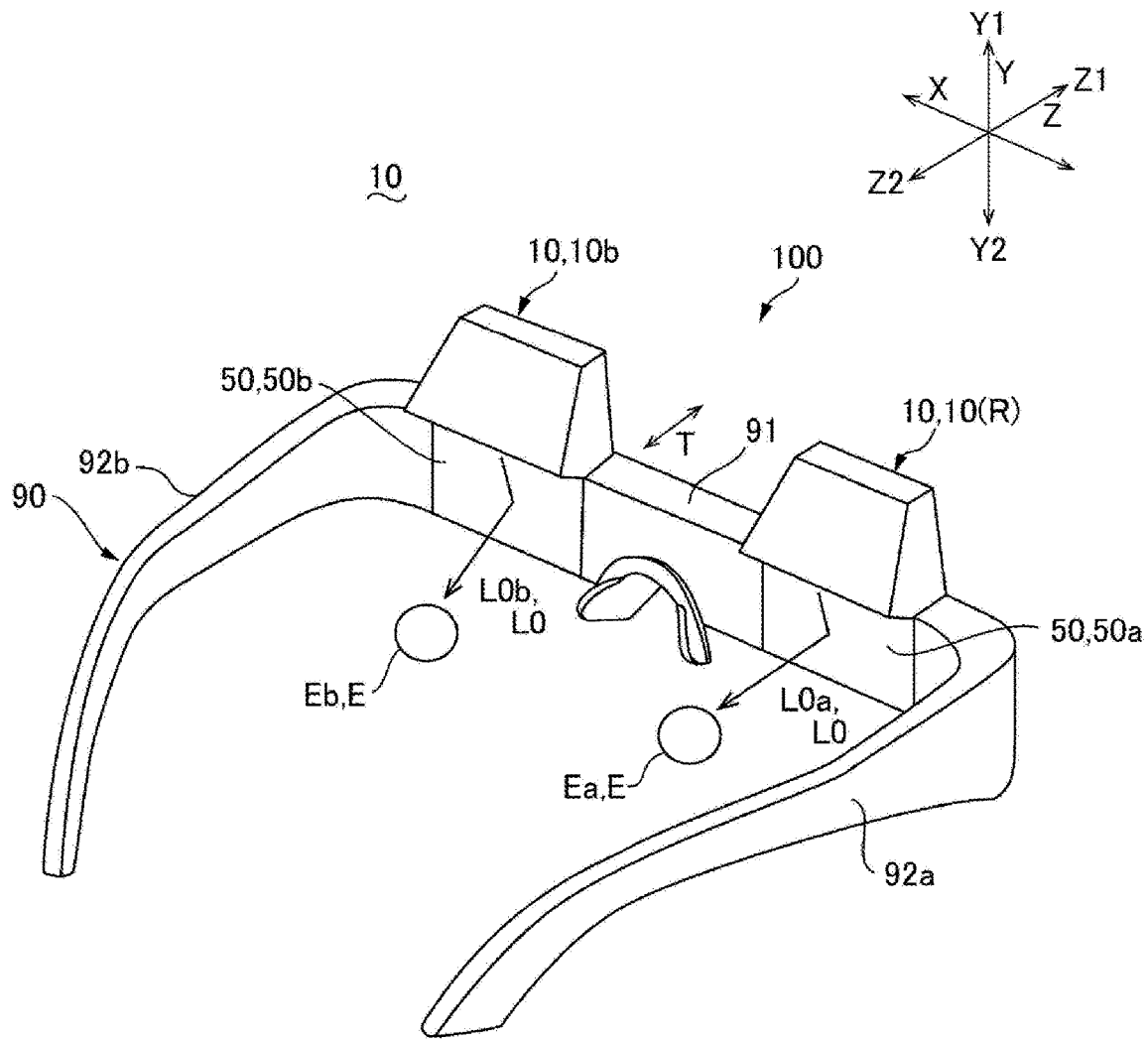
FIG. 19 is a schematic diagram of a display device according to Exemplary Embodiment 13 of the disclosure.
Figure 20:
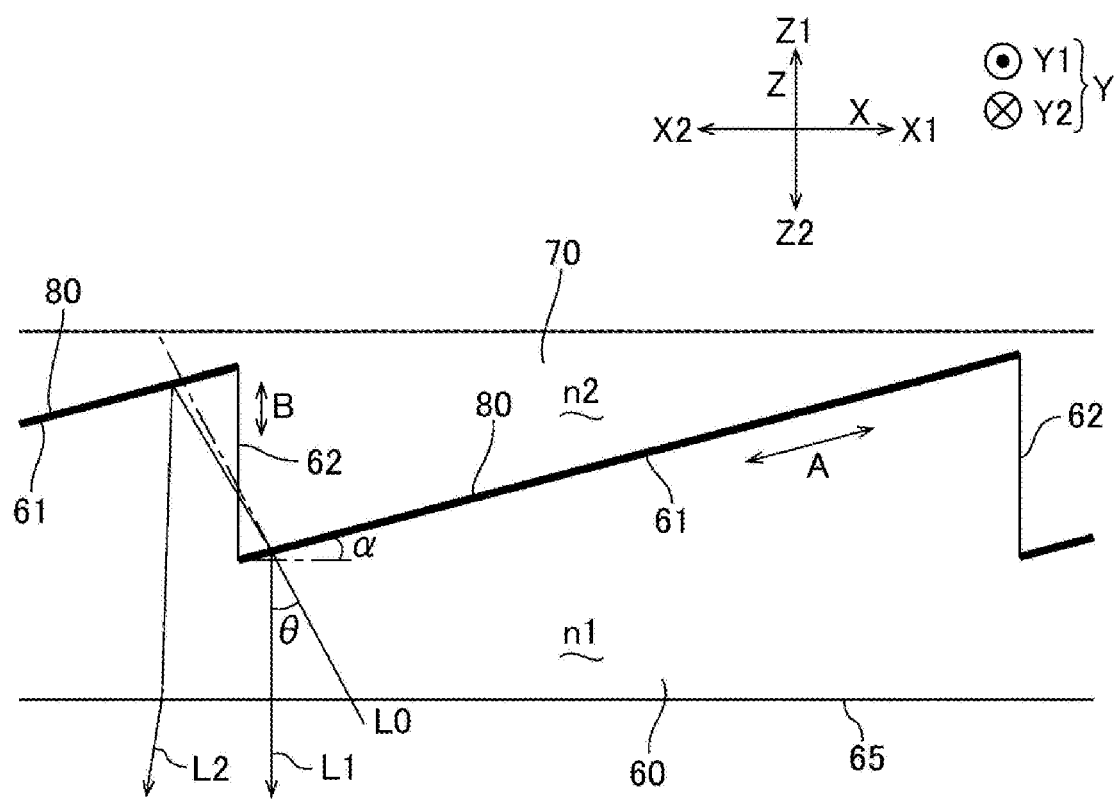
FIG. 20 is a schematic diagram of a light-guiding device according to a reference example of the disclosure.

FIG. 19 is a schematic diagram of a display device 100 according to Exemplary Embodiment 13 of the disclosure. In Exemplary Embodiments 1 to 7, the image light L0 is caused to travel in the horizontal direction X in the light-guiding device 50. As illustrated in FIG. 19, in Exemplary Embodiment 13, the disclosure may be applied to a case where the image light L0 in the light-guiding device 50 is caused to travel from the upper side Y1 to the lower side Y2 in the vertical direction Y and to be emitted to the eye E of the observer.

Other Exemplary Embodiment

In the above-described exemplary embodiments, the third surface 63 is provided between the end portion 611 of the first surface 61 on the first side T1 in the thickness direction T and the end portion 621 of the second surface 62 on the first side T1 in the thickness direction T. The third surface 63 may be provided between the end portion 612 of the first surface 61 on the second side T2 in the thickness direction T and the end portion 622 of the second surface 62 on the second side T2 in the thickness direction T. Further, the third surface 63 may be provided between the end portion 611 of the first surface 61 on the first side T1 in the thickness direction T and the end portion 621 of the second surface 62 on the first side T1 in the thickness direction T and also between the end portion 612 of the first surface 61 on the second side T2 in the thickness direction T and the end portion 622 of the second surface 62 on the second side T2 in the thickness direction T.

In the above-described exemplary embodiments, the second light-guiding body 70 is a light transmissive resin member, but the second light-guiding body 70 may be an air layer.

What is claimed is:

1. A light-guiding device comprising:
a first light-guiding body that includes, on a first side in a thickness direction, a plurality of first surfaces each extending along a first direction and a plurality of second surfaces each extending along a second direction intersecting the first direction between adjacent first surfaces among the plurality of first surfaces, and includes an end face on a second side in the thickness direction;
a plurality of first half mirrors each contacting the plurality of first surfaces; and
a second light-guiding body contacting the plurality of first half mirrors and the plurality of second surfaces, wherein
the first light-guiding body includes a plurality of third surfaces between adjacent first surface and second surface among the plurality of first surfaces and the plurality of second surfaces, each of the plurality of third surfaces overlapping the second surface in a direction along a third direction in which two first surfaces located on both sides of the second surface do not overlap each other, and
each of the plurality of third surfaces extends in a direction different from the first direction.

2. The light-guiding device according to claim 1, wherein the first light-guiding body has a refractive index different from a refractive index of the second light-guiding body.

3. The light-guiding device according to claim 1, further comprising:
a plurality of second half mirrors each contacting the plurality of third surfaces between the first light-guiding body and the second light-guiding body.

4. The light-guiding device according to claim 3, wherein the first half mirror has a reflectance identical to a reflectance of the second half mirror.

5. The light-guiding device according to claim 3, wherein the first half mirror has a reflectance different from a reflectance of the second half mirror.

6. The light-guiding device according to claim 1, wherein each of the plurality of third surfaces is provided, between adjacent first surface and second surface among the plurality of first surfaces and the plurality of second surfaces, between an end portion of the first surface on the first side in the thickness direction and an end portion of the second surface on the first side in the thickness direction.

7. The light-guiding device according to claim 6, wherein the first light-guiding body includes a fourth surface extending along the third direction, between adjacent first surface and second surface among the plurality of first surfaces and the plurality of second surfaces, between an end portion of the first surface on the second side in the thickness direction and an end portion of the second surface on the second side in the thickness direction.

8. The light-guiding device according to claim 7, further comprising:
a plurality of third half mirrors each contacting the plurality of fourth surfaces between the first light-guiding body and the second light-guiding body.

9. The light-guiding device according to claim 1, wherein each of the plurality of third surfaces is parallel to a direction in which the plurality of first surfaces and the plurality of second surfaces are arranged.

10. The light-guiding device according to claim 1, wherein
each of the plurality of third surfaces is an oblique surface inclined obliquely to a direction in which the plurality of first surfaces and the plurality of second surfaces are arranged.

11. The light-guiding device according to claim 1, wherein
each of the plurality of third surfaces is at least one of a protruding curved surface in which a central portion between a first boundary between the first surface and the third surface and a second boundary between the second surface and the third surface protrudes farther than the first boundary and the second boundary, and a recessed curved surface in which the central portion is recessed farther than the first boundary and the second boundary.

12. The light-guiding device according to claim 1, wherein
the third direction is a direction in which a beam of light incident on the first half mirror passes through the first half mirror and the second surface and travels.

13. The light-guiding device according to claim 1, wherein
positions of the plurality of first surfaces in the thickness direction vary along a direction in which the plurality of first surfaces are arranged with reference to the end face.

14. The light-guiding device according to claim 1, further comprising:
a plurality of fourth half mirrors each contacting the plurality of second surfaces between the first light-guiding body and the second light-guiding body.

15. The light-guiding device according to claim 1, wherein
each of the plurality of first surfaces is a recessed curved surface being recessed toward the second light-guiding body.

16. The light-guiding device according to claim 15, wherein
each of the plurality of first surfaces extends while being curved in a direction orthogonal to a direction in which the plurality of first surfaces and the plurality of second surfaces are arranged in such a way as to be a recessed curved surface being recessed in the direction in which the plurality of first surfaces and the plurality of second surfaces are arranged.

17. The light-guiding device according to claim 16, wherein
the second surface is curved along the first surface.

18. The light-guiding device according to claim 15, wherein
a curvature of each of the plurality of first surfaces varies along a direction in which the plurality of first surfaces and the plurality of second surfaces are arranged.

19. A display device comprising:
the light-guiding device according to claim 1; and
an image light emitting device configured to emit image light, wherein
the image light, in the first light-guiding body, is incident on each of the plurality of first surfaces from the third direction.

20. The display device according to claim 19, wherein
the image light is incident on the first light-guiding body from the end face of the first light-guiding body.

* * * * *